(12) United States Patent
Kim et al.

(10) Patent No.: US 12,639,575 B2
(45) Date of Patent: May 26, 2026

(54) MEMORY DEVICE PERFORMING PRUNING, METHOD OF OPERATING THE SAME, AND ELECTRONIC DEVICE PERFORMING PRUNING

(71) Applicant: SAMSUNG ELECTRONICS CO., LTD., Suwon-si (KR)

(72) Inventors: Ho-Youn Kim, Suwon-si (KR); Jong-Yoon Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 530 days.

(21) Appl. No.: 18/218,859

(22) Filed: Jul. 6, 2023

(65) Prior Publication Data

US 2024/0202526 A1 Jun. 20, 2024

(30) Foreign Application Priority Data

Dec. 16, 2022 (KR) ........................ 10-2022-0176972

(51) Int. Cl.
  *G06N 3/082* (2023.01)
  *G06N 3/0464* (2023.01)
(52) U.S. Cl.
  CPC ........... *G06N 3/082* (2013.01); *G06N 3/0464* (2023.01)
(58) Field of Classification Search
  CPC .............................. G06N 3/082; G06N 3/0464
  USPC ........................................................ 706/27
  See application file for complete search history.

(56) References Cited

U.S. PATENT DOCUMENTS

| | | | |
|---|---|---|---|
| 7,814,104 B2 | 10/2010 | Raghavan et al. | |
| 10,366,322 B2 | 7/2019 | David et al. | |
| 10,782,918 B2 | 9/2020 | Aga et al. | |
| 10,891,136 B1 | 1/2021 | Sodani | |
| 11,221,929 B1 | 1/2022 | Katz et al. | |
| 11,657,285 B2 * | 5/2023 | Courville ............... | G06N 3/045 |
| | | | 706/25 |
| 2013/0182776 A1 | 7/2013 | Zhang | |
| 2021/0125071 A1 * | 4/2021 | Ren ...................... | G06N 3/0495 |
| 2024/0046099 A1 * | 2/2024 | Dutta .................... | G06N 3/082 |

FOREIGN PATENT DOCUMENTS

| | | |
|---|---|---|
| CN | 114341825 A | 4/2022 |
| KR | 10-2021-0058318 A | 5/2021 |
| TW | 202227965 A | 7/2022 |

* cited by examiner

*Primary Examiner* — Hung T Vy
(74) *Attorney, Agent, or Firm* — Sughrue Mion, PLLC

(57) ABSTRACT

A method of operating a memory device which is configured to communicate with a host device, and which includes a memory cell array and a processing-in-memory (PIM) chip, including loading activation data and weight data from the memory cell array, by the PIM chip; generating pruned activation data by performing a first pruning operation on the activation data, by the PIM chip; providing the pruned activation data to the host device, by the PIM chip; generating pruned weight data by performing a second pruning operation on the weight data, by the PIM chip; providing the pruned weight data to the host device, by the PIM chip; and storing output data corresponding to a neural network operation performed based on the pruned activation data and the pruned weight data, by the memory cell array.

20 Claims, 16 Drawing Sheets

| APF (Multi Bit) | | Pruned | Definition | Description | |
|---|---|---|---|---|---|
| First Bit | Second Bit | | | Detail | |
| 0 | 0 | No | $Athn \leq f$ | Not pruned, and far from Ath | |
| 0 | 1 | No | $Athn \leq f < Athl$ | Not pruned, but near to Ath | |
| 1 | 1 | Yes | $Athl \leq f < Ath$ | Pruned, but near to Ath | |
| 1 | 0 | Yes | $f < Athl$ | Pruned, and far from Ath | |

$y = Fa(x)$

Athn  Ath  Athl

MEMORY DEVICE PERFORMING PRUNING, METHOD OF OPERATING THE SAME, AND ELECTRONIC DEVICE PERFORMING PRUNING

CROSS-REFERENCE TO RELATED APPLICATIONS

This application is based on and claims priority under 35 U.S.C. § 119 to Korean Patent Application No. 10-2022-0176972 filed on Dec. 16, 2022, in the Korean Intellectual Property Office, the disclosure of which is incorporated by reference herein in its entirety.

BACKGROUND

1. Field

The present disclosure relates to a memory device, and more particularly, to a memory device configured to perform a pruning, a method of operating the same, and an electronic device configured to perform a pruning.

2. Description of Related Art

A memory device may store data in response to a write request and output data stored therein in response to a read request. A memory device may be classified as a volatile memory device, which loses data stored therein when a power supply is interrupted, such as a dynamic random access memory (DRAM) device or a static RAM (SRAM) device, or a non-volatile memory device, which retains data stored therein even when a power supply is interrupted, such as a flash memory device, a phase-change RAM (PRAM), a magnetic RAM (MRAM), or a resistive RAM (RRAM).

Artificial intelligence (AI) may be applied to various fields such as inference and learning. As the size of data increases, the amount of computation for machine learning may rapidly increase. To improve the efficiency of machine learning, a pruning technique for omitting operations that have a relatively small influence on a processing result may be used. In general, a host device may read data stored in a memory device, may perform a pruning operation on the read data, and may perform a neural network operation based on the pruned data. As the computational load required for the host device increases, the computational speed of the host device may decrease, or the efficiency of the entire system may decrease.

SUMMARY

Provided are a memory device configured to perform a pruning, a method of operating the same, and an electronic device configured to perform a pruning.

In accordance with an aspect of the disclosure, a method of operating a memory device which is configured to communicate with a host device, and which includes a memory cell array and a processing-in-memory (PIM) chip, includes loading activation data and weight data from the memory cell array, by the PIM chip; generating pruned activation data by performing a first pruning operation on the activation data, by the PIM chip; providing the pruned activation data to the host device, by the PIM chip; generating pruned weight data by performing a second pruning operation on the weight data, by the PIM chip; providing the pruned weight data to the host device, by the PIM chip; and storing output data corresponding to a neural network operation performed based on the pruned activation data and the pruned weight data, by the memory cell array.

In accordance with an aspect of the disclosure, a memory device comprises a memory cell array configured to store activation data and weight data; and a processing-in-memory (PIM) chip configured to communicate with a host device and the memory cell array, wherein the PIM is further configured to: load the activation data and the weight data from the memory cell array; generate pruned activation data by performing a first pruning operation on the activation data; provide the pruned activation data to the host device; generate pruned weight data by performing a second pruning operation on the weight data; and provide the pruned weight data to the host device, and wherein the memory cell array is further configured to store output data corresponding to a neural network operation performed based on the pruned activation data and the pruned weight data.

In accordance with an aspect of the disclosure, an electronic device includes a host device; a memory device configured to store activation data and weight data; a pruning accelerator; and an interface circuit configured to provide an interface between the host device, the memory device, and the pruning accelerator, wherein the pruning accelerator is configured to: load the activation data and the weight data from the memory device; generate pruned activation data by performing a first pruning operation on the activation data; provide the pruned activation data to the host device; generate pruned weight data by performing a second pruning operation on the weight data; and provide the pruned weight data to the host device.

BRIEF DESCRIPTION OF DRAWINGS

The above and other, aspects, features, and advantages of the present disclosure will be more apparent from the following description taken in conjunction with the accompanying drawings, in which:

FIG. 1 is a block diagram of an electronic device according to an embodiment:

FIGS. 2A and 2B are diagrams describing prunings according to embodiments;

FIG. 6 is a diagram describing pruning according to some embodiments;

DETAILED DESCRIPTION

Figure 2A:
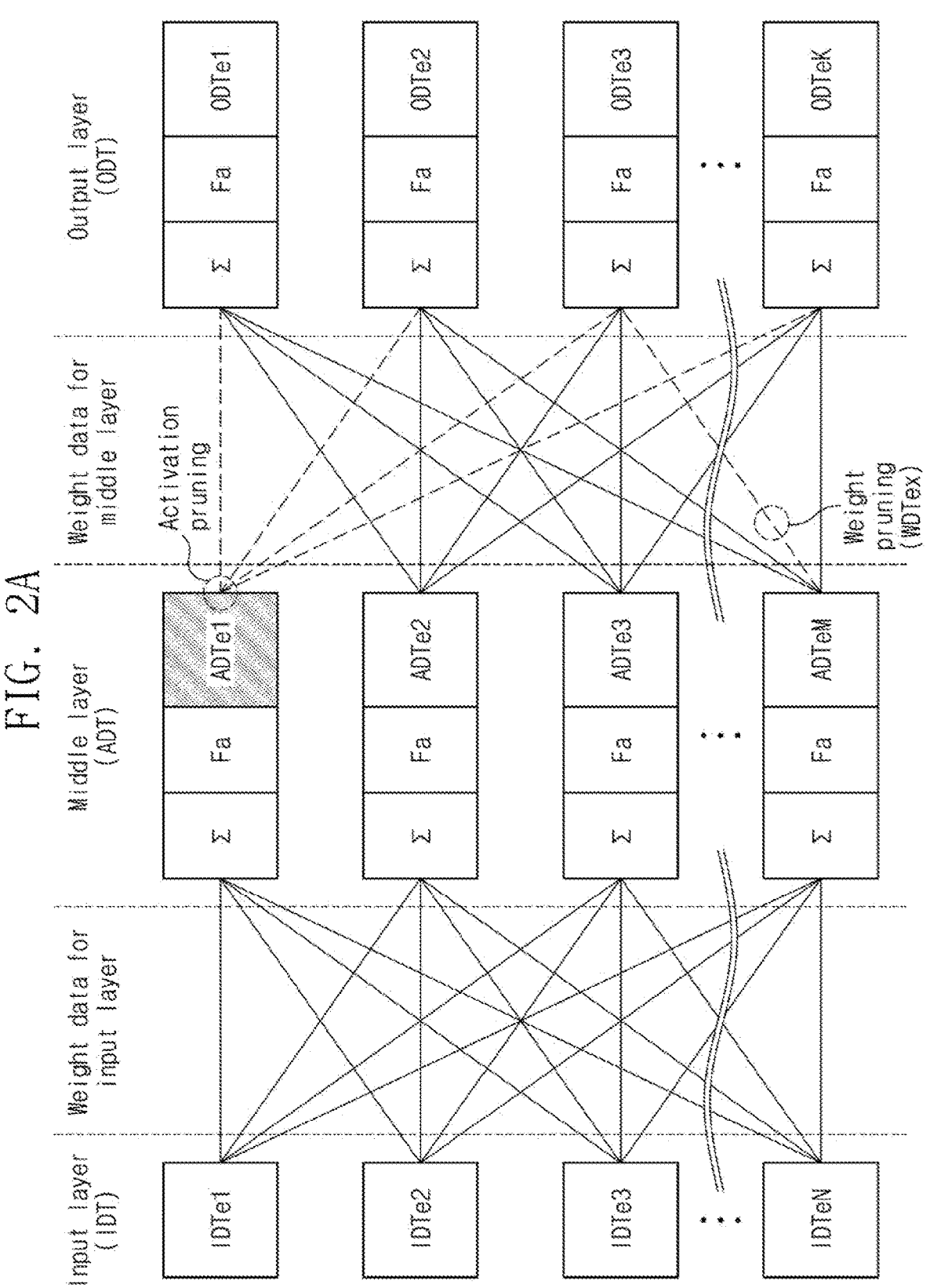

Below, embodiments of the present disclosure are described in detail with reference to the accompanying drawings.

As is traditional in the field, the example embodiments may be described and illustrated in terms of blocks which carry out a described function or functions. These blocks, which may be referred to herein as units, modules, circuits, blocks, controllers, nodes, or the like, are physically implemented by analog or digital circuits such as logic gates, integrated circuits, microprocessors, microcontrollers, memory circuits, passive electronic components, active electronic components, optical components, hardwired circuits, or the like, and in embodiments may be driven by firmware. The circuits may, for example, be embodied in one or more semiconductor chips, or on substrate supports such as printed circuit boards and the like. The circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of embodiments may be physically separated into two or more interacting and discrete blocks without departing from the scope of the disclosure. Likewise, the blocks of embodiments may be physically combined into more complex blocks without departing from the scope of the disclosure.

As used herein, expressions such as "at least one of" when preceding a list of elements, modify the entire list of elements and do not modify the individual elements of the list. For example, the expression, "at least one of a, b, and c" should be understood as including only a, only b, only c, both a and b, both a and c, both b and c, or all of a, b, and c.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Particular embodiments are illustrated by way of example in the drawings and will be described in detail below. It should be understood, however that the description of these particular embodiments is not intended to limit the disclosure to the specific forms disclosed, but on the contrary, the disclosure is intended to cover all modifications, equivalents, and alternatives falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In general, the same reference numerals are used throughout the description and the figures to reference the same, or substantially similar, features and components.

Figure 1:
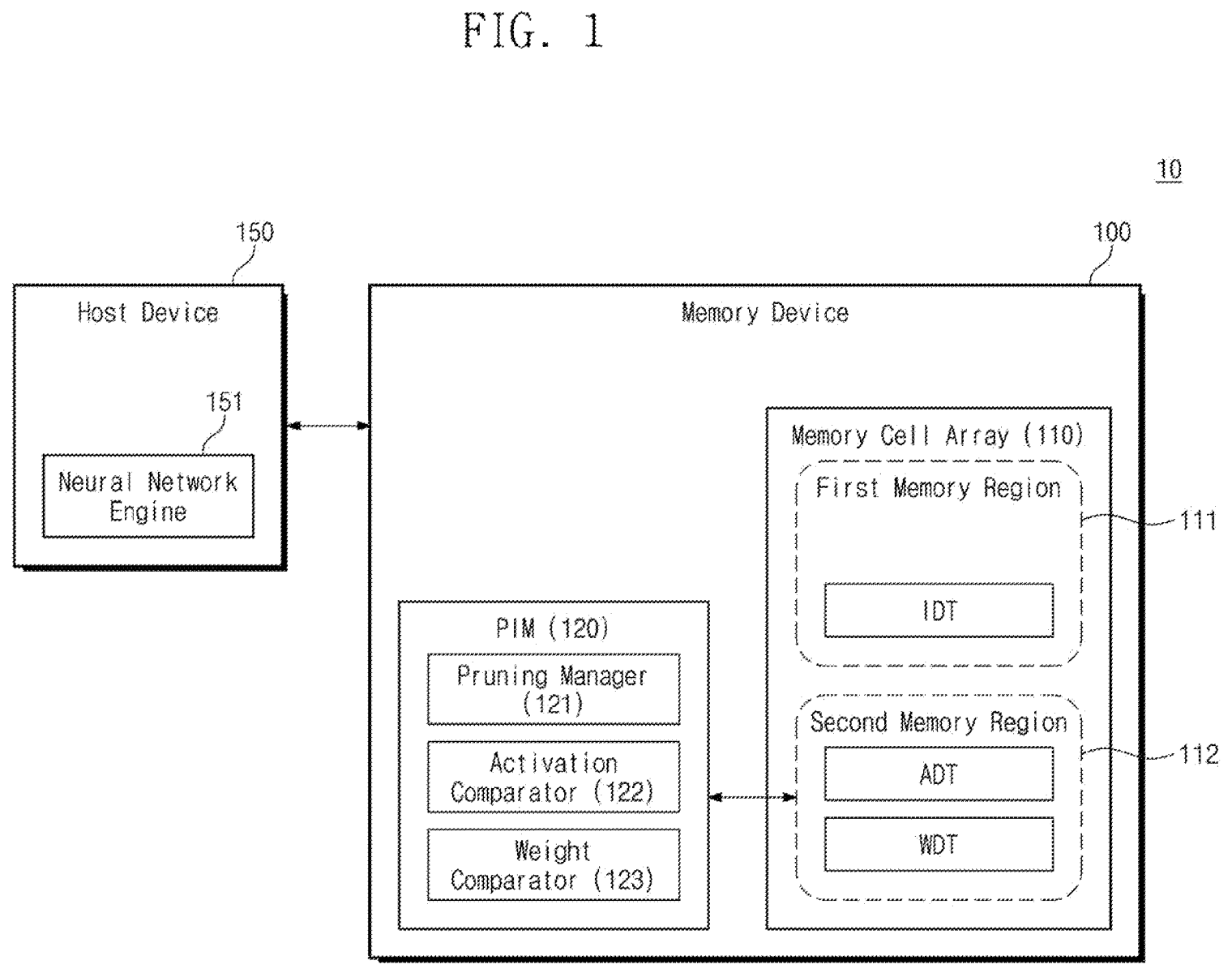

FIG. 1 is a block diagram of an electronic device according to an embodiment of the present disclosure. Referring to FIG. 1, an electronic device 10 may include a host device 150 and a memory device 100. The electronic device 10 may perform various operations based on data present in the memory device 100. For example, the electronic device 10 may be a computing system, which is configured to process a variety of information, such as a personal computer (PC), a notebook, a laptop, a server, a workstation, a tablet PC, a smartphone, a digital camera, and a black box.

The host device 150 may control an overall operation of the electronic device 10. For example, the host device 150 may store data in the memory device 100 or may read data stored in the memory device 100. The host device 150 may perform various operations based on the data read from the memory device 100. For example, the host device 150 may be implemented with a central processing unit (CPU), a graphics processing unit (GPU), a neural processing unit (NPU), etc.

The host device 150 may include a neural network engine 151. The neural network engine 151 may perform a neural network operation. The neural network operation may refer to an operation such as learning or inference in the artificial intelligence (AI) or machine learning. For example, the neural network operation may include a convolutional neural network (CNN) operation and may refer to multiplication or sum of input data or data of a middle layer and weight data corresponding thereto.

A large amount of data may be used in the neural network operation. The result of the neural network operation may be expressed as a probability. As the amount of data used in the neural network operation increases, the accuracy may increase. However, as the amount of data increases, the computational load of the neural network engine 151 may increase. The increase in the computational load may cause a decrease in the computational speed of the host device 150, which may result in, for example, a reduction of efficiency of the entire system of the electronic device 10.

A pruning technique may be used to increase the computational speed while maintaining the accuracy of data in the neural network operation. The pruning technique may refer to a technique for omitting an operation associated with data having a small influence on the result of the neural network operation. For example, data having a value which is less than or equal to a threshold value may be managed by being set to a zero value, or may be managed through a separate flag such that a multiplication operation for the data is omitted. The pruning may make it possible to reduce the amount of computation while maintaining the accuracy of an inference corresponding to the neural network operation. An example of the pruning is described in detail with reference to FIGS. 2A and 2B.

The memory device 100 may communicate with the host device 150. The memory device 100 may store data used for an operation of the host device 150. The memory device 100 may store data received from the host device 150 or may provide the stored data to the host device 150.

For example, the memory device 100 may be a volatile memory device, in which data stored therein are lost when a power is turned off, such as a dynamic random access memory (DRAM) device or a static random access memory (SRAM) device. In some embodiments, the memory device 100 may be a DRAM device specialized to assist the machine learning or neural network operation. However, embodiments are not limited thereto. For example, the memory device 100 may be implemented with a non-volatile memory device, which retains data stored therein even when a power is turned off, such as a phase-change RAM (PRAM), a magnetic RAM (MRAM), or a resistive RAM (RRAM).

The memory device 100 may include a memory cell array 110 and a processing-in-memory (PIM) 120. In embodiments, the PIM 120 may be referred to as at least one of a PIM unit, a PIM device, and a PIM chip. The memory cell array 110 may store data used for the operation of the host device 150. The memory cell array 110 may include a first memory region 111 and a second memory region 112.

The first memory region 111 may be allocated to store input data IDT.

The input data IDT may be raw data targeted for the neural network operation. The input data IDT may be also referred to as "data of an input layer". For example, the input data IDT may be raw image data that are used in learning or inference. The input data IDT may include a plurality of input elements. The input elements may indicate values of a plurality of pixels that are arranged in a row direction and a column direction.

The second memory region 112 may be allocated to store activation data ADT and weight data WDT. The second memory region 112 may be also referred to as "a neural network data region".

The activation data ADT may be middle data that are obtained by the neural network operation performed based on the input data IDT. The activation data ADT may be also referred to as "data of a middle layer". For example, the activation data ADT may be obtained by applying an activation function to a value obtained by summing results of multiplying the input elements of the input data IDT and weight elements of corresponding weight data.

The activation function may determine a value to be output to a next layer in the neural network operation. In some embodiments, the activation function may be one of a sigmoid function, a hyperbolic tangent function, a softmax function, a rectified linear unit (ReLu) function, a leaky ReLu function, and an exponential linear unit function.

The activation data ADT may include a plurality of activation elements. Each of the plurality of activation elements may have a value corresponding to a neural network operation of a previous layer. The activation data ADT may be also referred an "input data of a next layer". The activation data ADT in the last layer (i.e., the output layer) may be also referred to as "output data" or a "feature map". The output data may indicate a result of the learning or inference according to the neural network operation.

The weight data WDT may be multiplied by the input data IDT or the activation data ADT in the neural network operation. The weight data WDT may be also referred to as "kernel data or filter data". The weight data WDT may include a plurality of weight elements. The weight elements may have values trained for inference or decision and may be multiplied by corresponding input elements or corresponding activation elements.

The PIM 120 may manage the memory cell array 110. The PIM 120 may perform processing on the activation data ADT and the weight data WDT of the memory cell array 110 and may provide the host device 150 with the activation data ADT and the weight data WDT experiencing the processing.

The PIM 120 may include a pruning manager 121, an activation comparator 122, and a weight comparator 123. The pruning manager 121 may load the activation data ADT and the weight data WDT from the second memory region 112 of the memory cell array 110, may perform the pruning for the activation data ADT and the pruning for the weight data WDT, and may provide the pruned activation data and the pruned weight data to the host device 150.

The activation comparator 122 may assist the pruning of the activation data ADT under control of the pruning manager 121. Under control of the pruning manager 121, the activation comparator 122 may load the activation data ADT from the second memory region 112 of the memory cell array 110, may determine whether each of the activation elements of the activation data ADT is smaller than an activation threshold value, may generate pruned activation data by pruning at least one activation element determined to be smaller than the activation threshold value from among the activation elements, and may provide the pruned activation data to the host device 150.

In some embodiments, at least part of the activation comparator 122 may be implemented on a bit line sense amplifier (BLSA) in the memory device 100, may be implemented on an input/output (I/O) circuit or an I/O line (e.g., a data input path or a data output path) in the memory device 100, or may be implemented as a separate circuit disposed adjacent to the bit line sense amplifier, the I/O circuit, and the I/O line.

The weight comparator 123 may assist the pruning of the weight data WDT under control of the pruning manager 121. Under control of the pruning manager 121, the weight comparator 123 may load the weight data WDT from the second memory region 112 of the memory cell array 110, may determine whether each of the weight elements of the weight data WDT is smaller than a weight threshold value, may generate pruned weight data by pruning at least one weight elements determined to be smaller than the weight threshold value from among the weight elements, and may provide the pruned weight data to the host device 150.

In some embodiments, at least part of the weight comparator 123 may be implemented on the bit line sense amplifier (BLSA) in the memory device 100, may be implemented on the I/O circuit or the I/O line in the memory device 100, or may be implemented as a separate circuit disposed adjacent to the bit line sense amplifier, the I/O circuit, and the I/O line.

The host device 150 may receive the pruned activation data and the pruned weight data from the PIM 120. The host device 150 may perform the neural network operation based on at least one of the pruned activation data and the pruned weight data. According to embodiments, the host device 150 may perform the neural network operation without an additional operation for the pruning, and thus, the computational load of the host device 150 may decrease.

As described above, according to embodiments, the computational load for pruning required of the host device 150 may decrease by pruning the activation data ADT or the weight data WDT by using the PIM 120 of the memory device 100. Accordingly, embodiments may provide an electronic device 10 in which the speed at which the host device 150 performs the neural network operation is improved, the efficiency of the entire system is improved, and an effective bandwidth is improved.

Figure 2B:
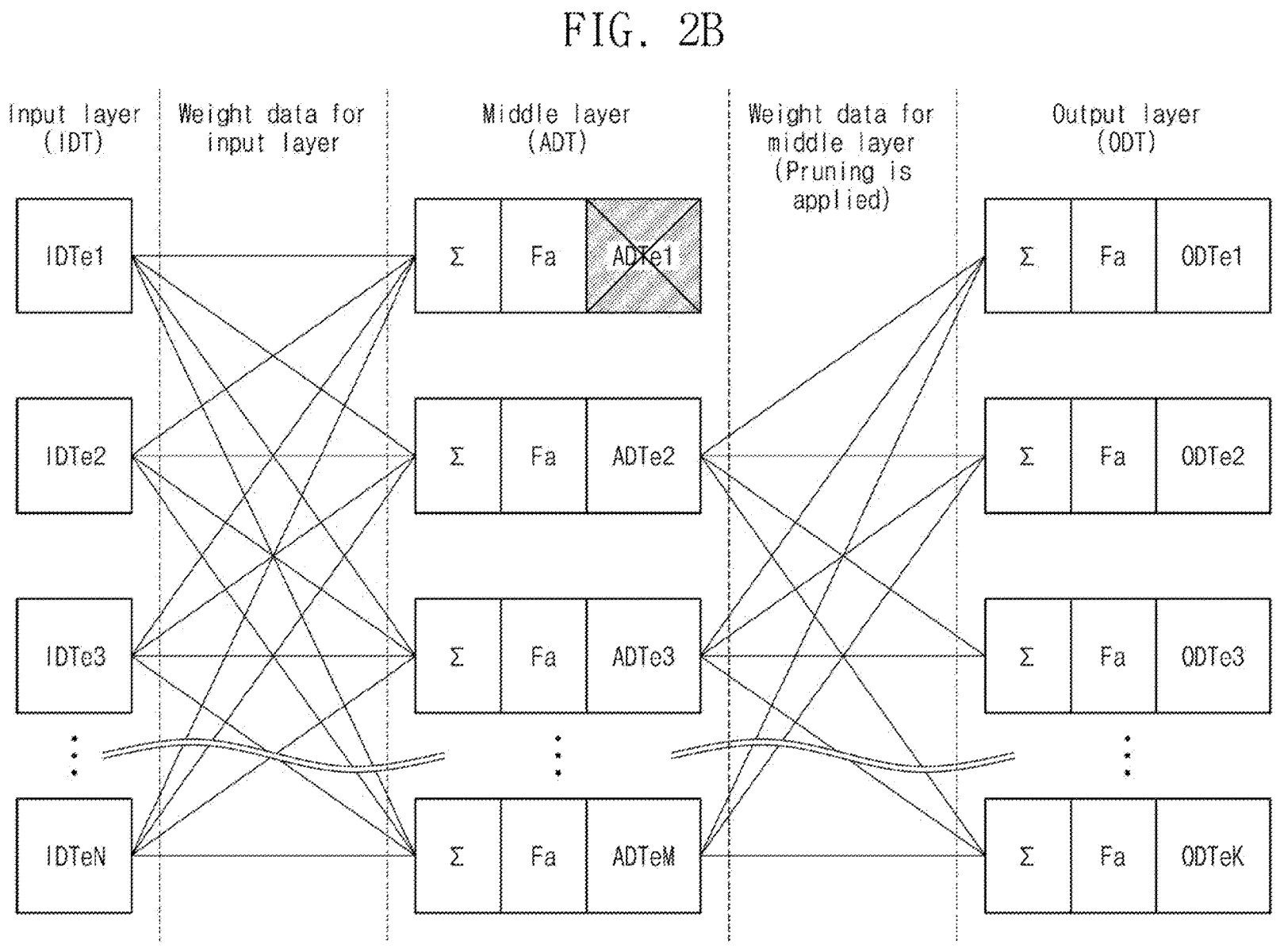

FIGS. 2A and 2B are diagrams describing prunings according to some embodiments of the present disclosure. FIG. 2A describes the pruning of activation data and the pruning of weight data. FIG. 2B describes a neural network operation simplified by applying the pruning.

Referring to FIGS. 1 and 2A, the host device 150 may obtain the activation data ADT based on the neural network operation performed based on the input data IDT and may obtain output data ODT based on the neural network operation performed based on the activation data ADT.

An input layer may correspond to the input data IDT. The input data IDT may include a plurality of input elements IDTe1 to IDTeN. Herein, "N" may denote any natural number.

The host device 150 may obtain the activation data ADT by performing the neural network operation based on the input data IDT of the input layer and corresponding weight data. The activation data ADT may correspond to the middle layer. The activation data ADT may include a plurality of activation elements ADTe1 to ADTeM. Herein, "M" may denote any natural number.

For example, the host device 150 may obtain a corresponding activation element by applying an activation function Fa to a summed value of multiplications of the plurality of input elements IDTe1 to IDTeN and a plurality of weight elements of corresponding weight data. In FIG. 2A, lines between the input layer and the middle layer may correspond to the plurality of weight elements.

The host device 150 may obtain the output data ODT by performing the neural network operation based on the activation data ADT of the middle layer and corresponding weight data. The output data ODT may correspond to the output layer. The output data ODT may include a plurality of output elements ODTe1 to ODTeK. Herein, "K" may denote any natural number.

For example, the host device 150 may obtain a corresponding output element by applying the activation function Fa to a summed value of multiplications of the plurality of activation elements ADTe1 to ADTeM and a plurality of weight elements of corresponding weight data. In FIG. 2A, lines between the middle layer and the output layer may correspond to the plurality of weight elements. In this case, a solid line may correspond to an operation to which the pruning is not applied, and a dashed line may correspond to an operation to which the pruning is applied.

In FIG. 2A, the output data ODT are described as being obtained from the activation data ADT, but embodiments are not limited thereto. The number of middle layers may increase; in this case, the host device 150 may obtain activation data of a next layer from the activation data ADT, instead of the output data ODT.

In some embodiments the PIM 120 of the memory device 100 may perform the pruning of the activation data ADT. For example, the PIM 120 may determine that the first activation element ADTe1 of the activation data ADT is smaller than the activation threshold value, may prune the first activation element ADTe1, and may provide the host device 150 with activation data including the pruned first activation element. The host device 150 may omit the neural network operation for the pruned first activation element. For example, the omitted operations may be indicated by shading.

In some embodiments the PIM 120 of the memory device 100 may perform the pruning of the weight data WDT. For example, the PIM 120 may determine that a target weight element WDTex of the weight data WDT is smaller than the weight threshold value, may prune the target weight element WDTex, and may provide the host device 150 with weight data including the pruned target weight element. The host device 150 may omit the neural network operation for the pruned target weight element. For example, the omitted operations may be indicated by dashed lines.

An example of a neural network operation simplified by applying the pruning is described with reference to FIG. 2B. Operations corresponding to the first activation element ADTe1 may be omitted by the pruning of activation data. An operation corresponding to the target weight element WDTex may be omitted by the pruning of weight data. As the neural network is simplified, the amount of computation may decrease, and an overfitting issue may be solved.

Figure 3:
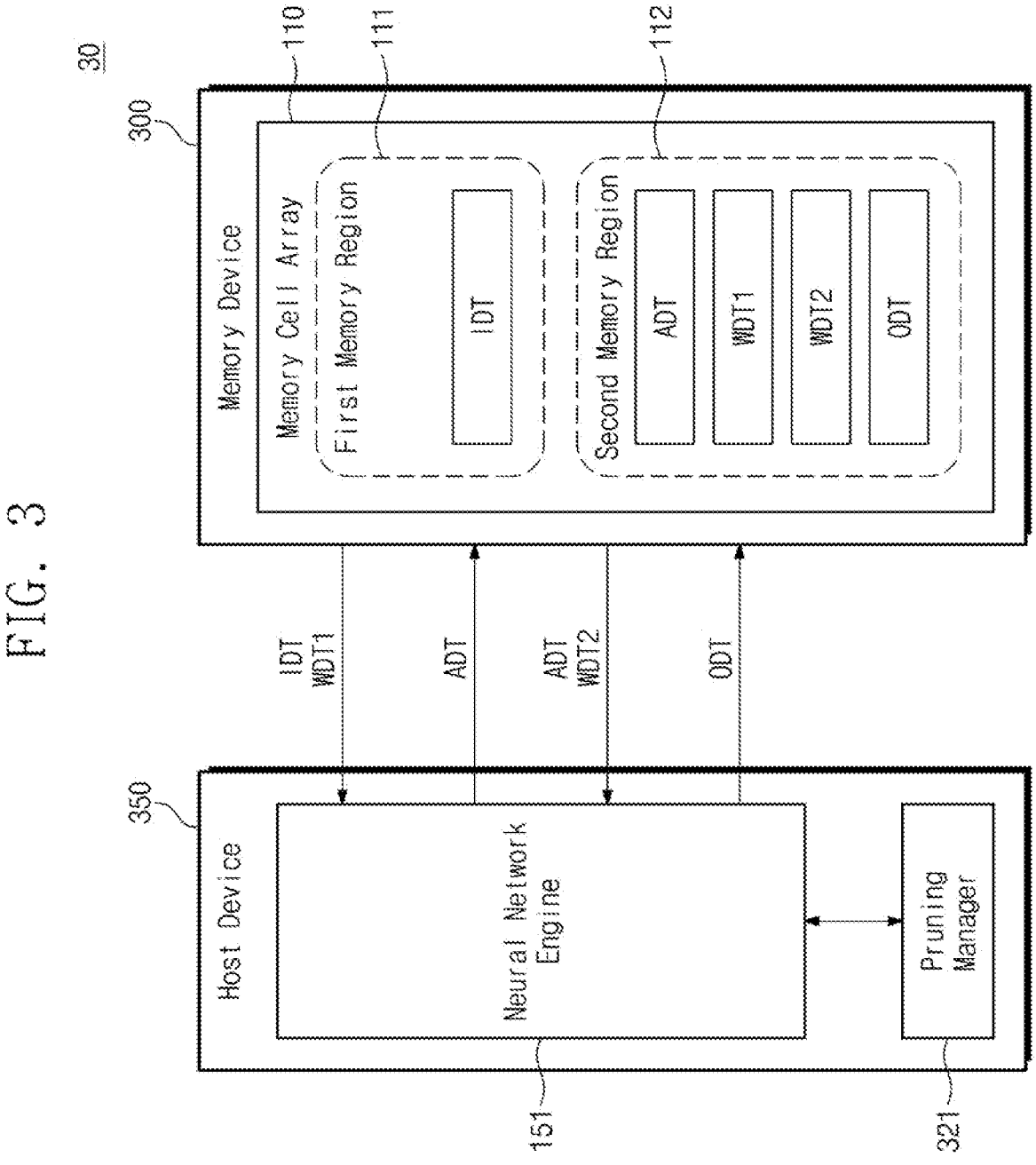
FIG. 3 is a block diagram describing an electronic device according to an embodiment.

FIG. 3 is a block diagram describing an electronic device according to an embodiment of the present disclosure. Referring to FIG. 3, an electronic device 30 may include a host device 350 and a memory device 300. The host device 350 may include a neural network engine 151 and a pruning manager 321. The memory device 300 may include a memory cell array 110. The memory cell array 110 may include a first memory region 111 and a second memory region 112.

The first memory region 111 may be allocated to store input data IDT. The second memory region 112 may be allocated to store the activation data ADT, first weight data WDT1, second weight data WDT2, and the output data ODT.

The neural network engine 151 may receive the input data IDT and the first weight data WDT1 from the memory device 100. The pruning manager 321 may perform the pruning of the first weight data WDT1. The neural network engine 151 may generate the activation data ADT based on the neural network operation performed based on the input data IDT and the pruned first weight data. The neural network engine 151 may provide the activation data ADT to the memory device 100.

The neural network engine 151 may receive the activation data ADT and the second weight data WDT2 from the memory device 100. The pruning manager 321 may perform the pruning of the activation data ADT and the second weight data WDT2. The neural network engine 151 may generate the output data ODT based on the neural network operation performed based on the pruned activation data and the pruned second weight data. The neural network engine 151 may provide the output data ODT to the memory device 100.

The pruning manager 321 may consume a resource of the host device 250 for the purpose of performing the pruning. The pruning operation may be frequently performed in the neural network operation and the process of comparing the activation data or the weight data with the threshold value periodically is required, and thus, the overhead may be great. Because the pruning operation may remove activation data or weight data which is less than or equal to one or more threshold values, the subject of the pruning operation may be a device other than the host device 250, and the way to off-load the pruning operation to the memory device 100 for the load-balancing of the entire system may be considered.

Figure 4:
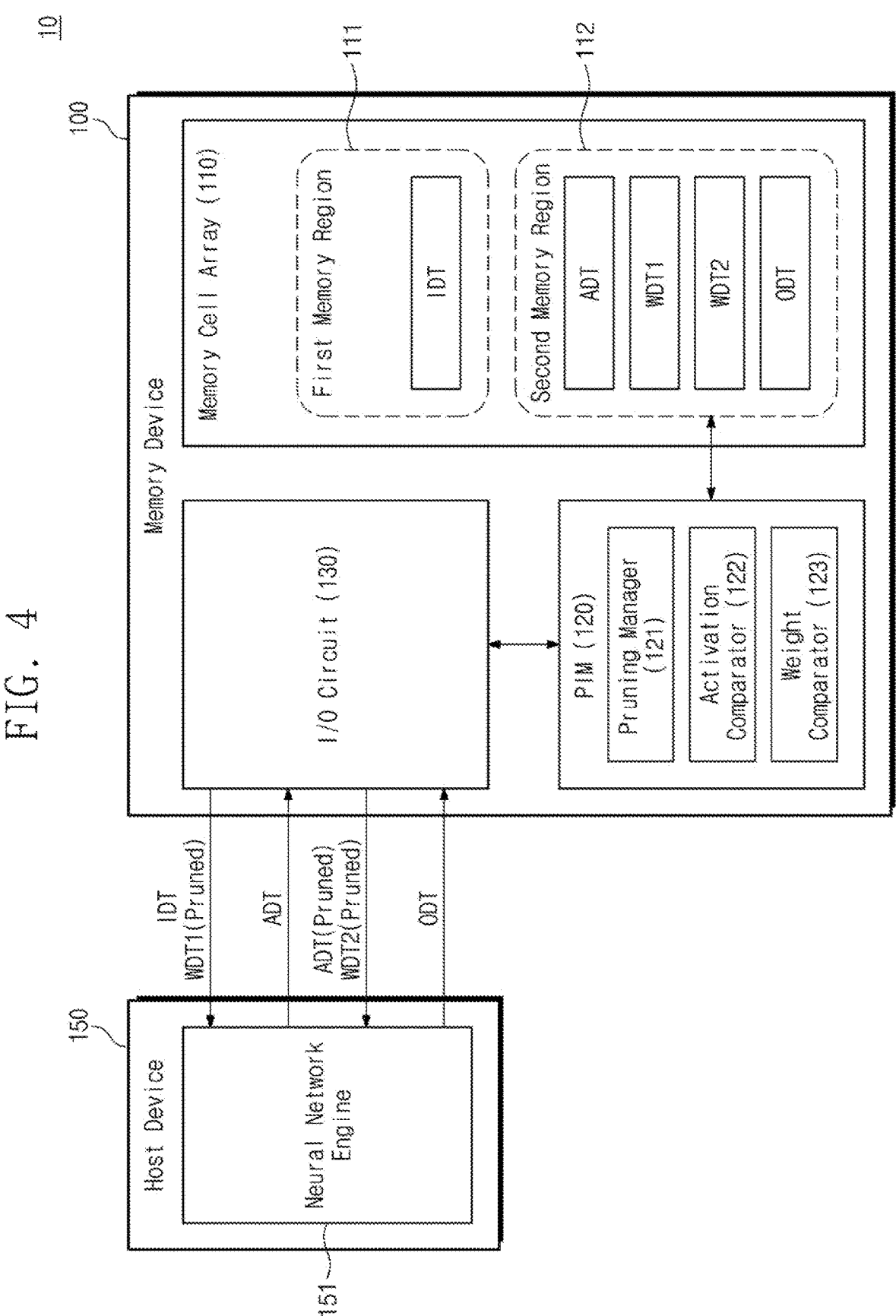
FIG. 4 is a block diagram describing an electronic device according to some embodiments.

FIG. 4 is a block diagram describing an electronic device according to embodiments of the present disclosure. Referring to FIG. 4, the electronic device 10 may include the host device 150 and the memory device 100. The host device 150 may include the neural network engine 151. The memory device 100 may include the memory cell array 110, the PIM 120, and an I/O circuit 130.

The memory cell array 110 may include a first memory region 111 and a second memory region 112. The first memory region 111 may be allocated to store the input data IDT. The second memory region 112 may be allocated to store the activation data ADT, the first weight data WDT1, the second weight data WDT2, and the output data ODT.

The PIM 120 may include the pruning manager 121, the activation comparator 122, and the weight comparator 123. The pruning manager 121, the activation comparator 122, and the weight comparator 123 may be similar to the pruning manager 121, the activation comparator 122, and the weight comparator 123 of FIG. 1, and thus, additional description which may be duplicative or redundant may be omitted to avoid redundancy.

The PIM 120 may load the input data IDT from the first memory region 111 of the memory cell array 110 and may load the first weight data WDT1 from the second memory region 112 of the memory cell array 110. The PIM 120 may perform the pruning of the first weight data WDT1 to generate pruned first weight data. The PIM 120 may provide the input data IDT and the pruned first weight data to the host device 150 through the I/O circuit 130.

The neural network engine 151 may perform the neural network operation based on the input data IDT and the pruned first weight data, may generate the activation data ADT corresponding to the neural network operation, and may provide the activation data ADT to the I/O circuit 130. The memory cell array 110 may store the activation data ADT received through the I/O circuit 130 in the second memory region 112.

The PIM 120 may load the activation data ADT and the second weight data WDT2 from the second memory region 112 of the memory cell array 110. The PIM 120 may perform the pruning of the activation data ADT to generate pruned activation data. The PIM 120 may perform the pruning of the second weight data WDT2 to generate pruned second weight data. The PIM 120 may provide the pruned activation data and the pruned second weight data to the host device 150 through the I/O circuit 130.

The neural network engine 151 may perform the neural network operation based on the pruned activation data and the pruned second weight data, may generate the output data ODT corresponding to the neural network operation, and may provide the output data ODT to the I/O circuit 130. The memory cell array 110 may store the output data ODT received through the I/O circuit 130 in the second memory region 112.

Figure 5:
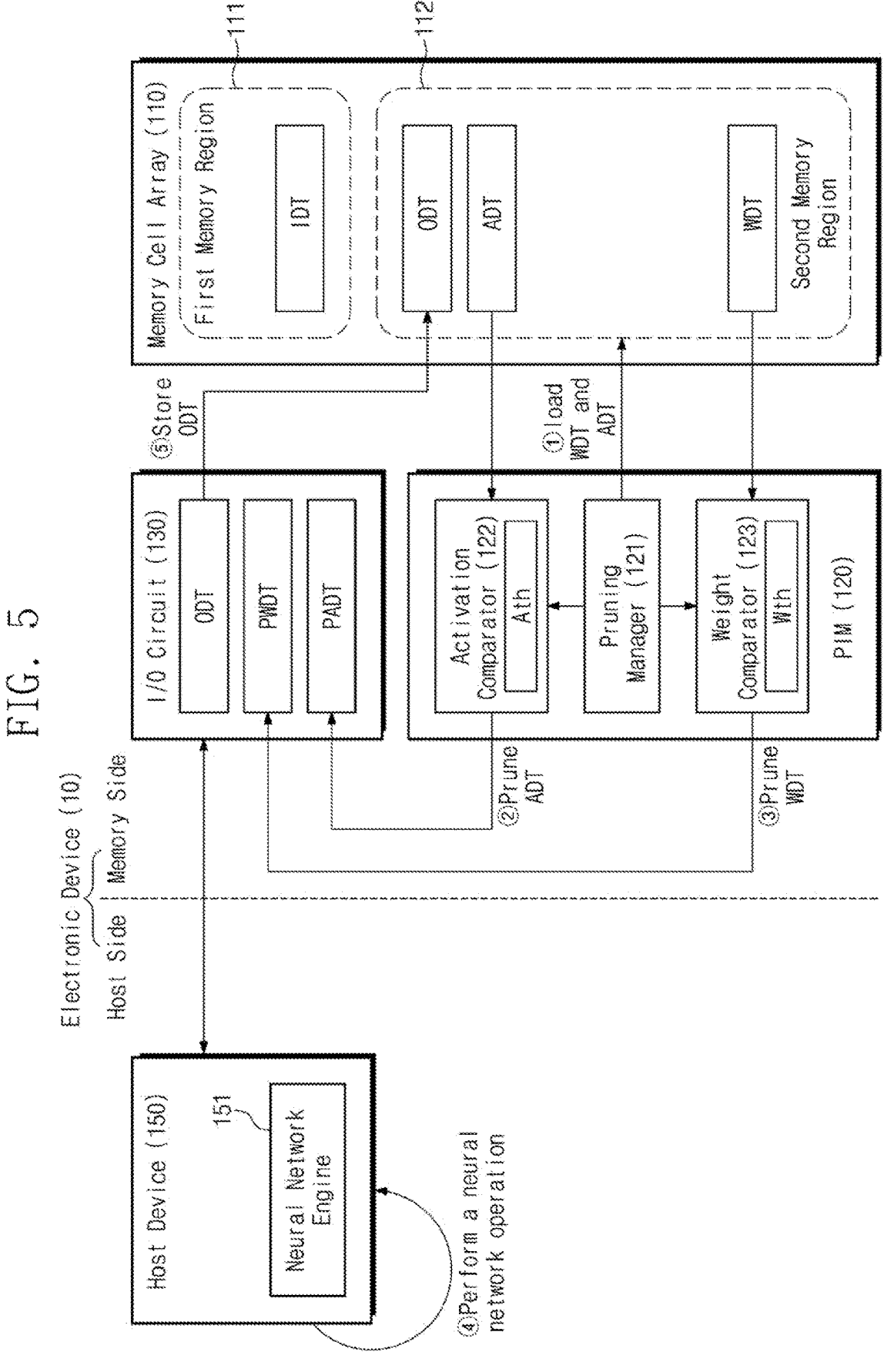
FIG. 5 is a diagram describing a method of operating an electronic device according to some embodiments.

FIG. 5 is a diagram describing a method of operating an electronic device according to some embodiments of the present disclosure. An example of a method of operating the electronic device 10 that performs pruning on the memory side is described with reference to FIG. 5. The electronic device 10 may correspond to the electronic device 10 of FIGS. 1 and 4. The electronic device 10 may include the host device 150 on the host side. The host device 150 may include a neural network engine. The electronic device 10 may include the memory cell array 110, the PIM 120, and I/O circuit 130 on the memory side.

The memory cell array 110 may include a first memory region 111 and a second memory region 112. The first memory region 111 may be allocated to store the input data IDT. The second memory region 112 may be allocated to store the activation data ADT, the weight data WDT, and the output data ODT. The weight data WDT may be used in the neural network operation associated with the activation data ADT.

The PIM 120 may include the pruning manager 121, the activation comparator 122, and the weight comparator 123. The pruning manager 121 may manage the pruning of the activation data ADT and the pruning of the weight data WDT. Under control of the pruning manager 121, the activation comparator 122 may perform the pruning of the activation data ADT based on the activation data ADT and an activation threshold value Ath. Under control of the pruning manager 121, the weight comparator 123 may perform the pruning of the weight data WDT based on the comparison of the weight data WDT and a weight threshold value Wth.

Below, an example of the method of operating the electronic device 10 according to some embodiments of the present disclosure is described in detail.

In a first operation ①, the pruning manager 121 may load the activation data ADT and the weight data WDT from the second memory region 112 of the memory cell array 110. The activation data ADT may be a result of the neural network operation of the previous layer. For example, the activation data ADT may be obtained by applying an activation function to a summed value of multiplications of input elements of input data and weight elements of corresponding weight data.

In some embodiments, the activation function may be one of a sigmoid function, a hyperbolic tangent function, a softmax function, a rectified linear unit (ReLu) function, a leaky ReLu function, and an exponential linear unit function.

In a second operation ②, the pruning manager 121 may generate pruned activation data PADT by performing the pruning of the activation data ADT through the activation comparator 122. The pruning manager 121 may provide the pruned activation data PADT to the I/O circuit 130. The I/O circuit 130 may provide the pruned activation data PADT to the host device 150.

For example, under control of the pruning manager 121, the activation comparator 122 may determine whether each of the activation elements of the activation data ADT is smaller than the activation threshold value Ath, may generate the pruned activation data PADT by pruning at least one activation elements determined to be smaller than the activation threshold value Ath from among the activation elements, and may provide the pruned activation data PADT to the host device 150 through the I/O circuit 130.

In some embodiments, the pruning manager 121 may select one of a write-to-cell mode or a transfer-to-system mode and may perform the pruning of the activation data ADT based on the selected mode.

For example, when the write-to-cell mode is selected, the pruning manager 121 may overwrite the pruned activation data PADT on the activation data ADT of the memory cell array 110. An example of the write-to-cell mode is described in detail with reference to FIG. 6.

As another example, when the transfer-to-system mode is selected, the pruning manager 121 may provide an activation pruning flag indicating the pruning result to the host device 150 while maintaining the activation data ADT of the memory cell array 110. An example of the transfer-to-system mode is described in detail with reference to FIGS. 7 and 8.

In a third operation ③, the pruning manager 121 may generate pruned weight data PWDT by performing the pruning of the weight data WDT through the weight comparator 123. The pruning manager 121 may provide the pruned weight data PWDT to the I/O circuit 130. The I/O circuit 130 may provide the pruned weight data PWDT to the host device 150.

For example, under control of the pruning manager 121, the weight comparator 123 may determine whether each weight element of the weight data WDT is smaller than the weight threshold value Wth, may generate the pruned weight data PWDT by pruning at least one weight element determined to be smaller than the weight threshold value Wth from among the weight elements, and may provide the pruned weight data PWDT to the host device 150 through the I/O circuit 130.

In some embodiments, the pruning manager 121 may select one of the write-to-cell mode or the transfer-to-system mode and may perform the pruning of the weight data WDT based on the selected mode.

For example, when the write-to-cell mode is selected, the pruning manager 121 may overwrite the pruned weight data PWDT on the weight data WDT of the memory cell array 110.

As another example, when the transfer-to-system mode is selected, the pruning manager 121 may provide a weight pruning flag indicating the pruning result to the host device 150 while maintaining the weight data WDT of the memory cell array 110.

In a fourth operation ④, the neural network engine 151 of the host device 150 may perform the neural network operation based on the pruned activation data PADT and the pruned weight data PWDT, may generate the output data ODT corresponding to the neural network operation, and may provide the output data ODT to the I/O circuit 130. The output data ODT may include a plurality of output elements. Each of the plurality of output elements may be obtained by applying an activation function to a summed value of multiplications of corresponding activation elements of the pruned activation data PADT and corresponding weight elements of the pruned weight data PWDT.

Accordingly, instead of directly performing the pruning of the activation data ADT and the pruning of the weight data WDT, the host device 150 may receive the pruned activation data PADT and the pruned weight data PWDT from the memory side. As a result, the resources of the host device 150 may be conserved, and the load-balancing of the entire system of the electronic device 10 may be improved.

In a fifth operation ⑤, the memory cell array 110 may receive the output data ODT from the I/O circuit 130. The memory cell array 110 may store the output data ODT in the second memory region 112. When the output data ODT are middle data of the middle layer, the output data ODT may be used in the neural network operation of the next layer. When the output data ODT are data of the output layer or the last layer, the output data ODT may be used as a result of learning or inference. When the learning or inference result is not appropriate, the host device 150 may change the activation threshold value Ath or the weight threshold value Wth and may again perform the neural network operation.

Figure 6:
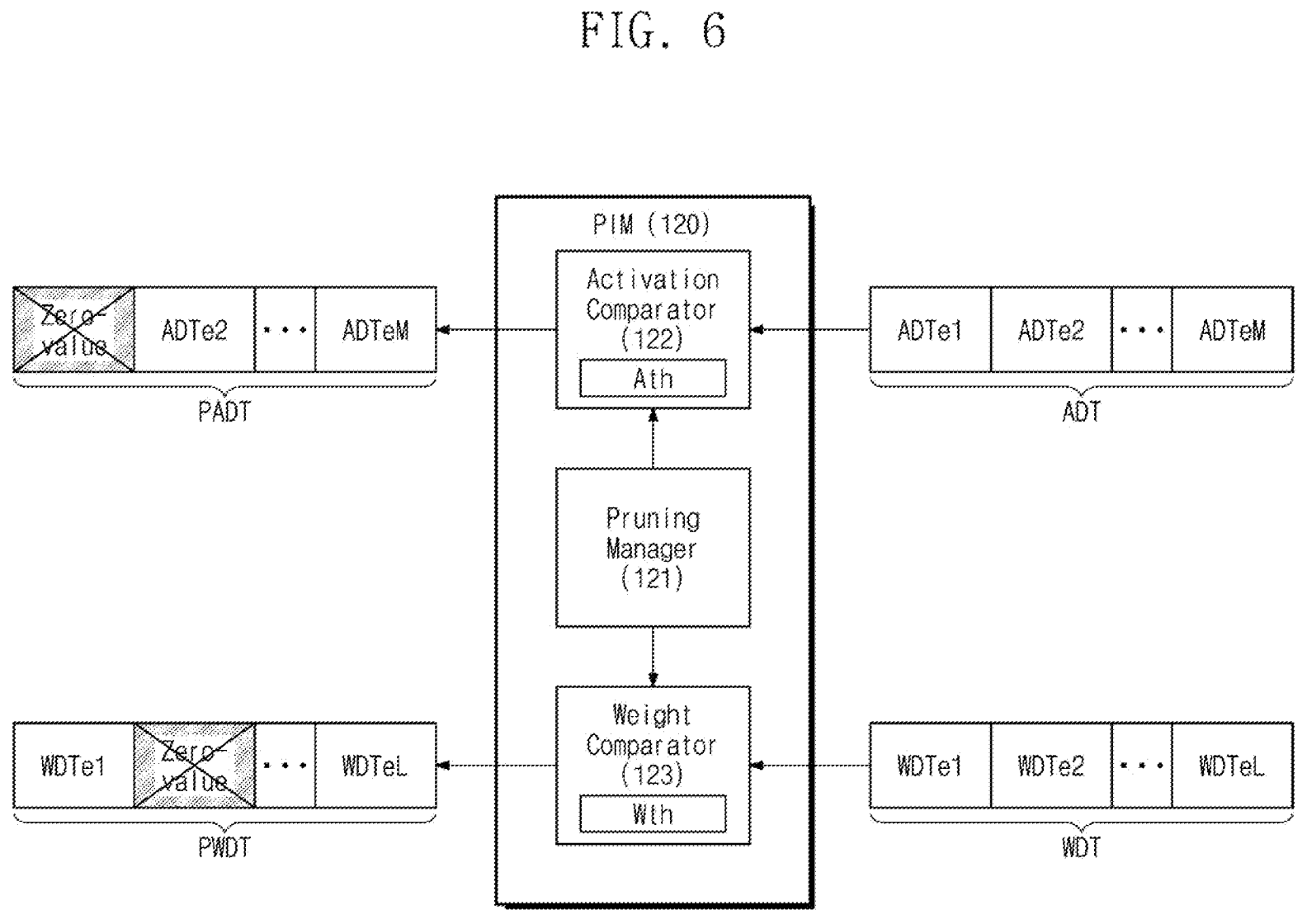

FIG. 6 is a diagram describing pruning according to some embodiments of the present disclosure. Referring to FIGS. 5 and 6, the PIM 120 may perform the pruning of the activation data ADT and the pruning of the weight data WDT in the write-to-cell mode. The PIM 120 may include the pruning manager 121, the activation comparator 122, and the weight comparator 123. The pruning manager 121 may manage the pruning of the activation data ADT and the pruning of the weight data WDT.

Under control of the pruning manager 121, the activation comparator 122 may set a value of a pruned activation element of the activation data ADT to the zero value. For example, under control of the pruning manager 121, the activation comparator 122 may determine whether each of the plurality of activation elements ADTe1 to ADTeM of the activation data ADT is smaller than the activation threshold value Ath, may generate the pruned activation data PADT by setting a value of the first activation element ADTe1, which is determined to be smaller than the activation threshold value Ath, to the zero value, and may provide the pruned activation data PADT to the host device 150. Herein, "M" may denote any natural number.

In some embodiments, under control of the pruning manager 121, the activation comparator 122 may overwrite the pruned activation data PADT on the activation data ADT of the second memory region 112 of the memory cell array 110. For example, the storage space of the memory cell array 110 may be conserved by overwriting the pruned activation data PADT on the activation data ADT, instead of maintaining the activation data ADT of the second memory region 112 of the memory cell array 110, after the pruning of the activation data ADT.

Under control of the pruning manager 121, the weight comparator 123 may set a value of a pruned weight element of the weight data WDT to the zero value. For example, under control of the pruning manager 121, the weight comparator 123 may determine whether each of the plurality of weight elements WDTe1 to WDTeL of the weight data WDT is smaller than the weight threshold value Wth, may generate the pruned weight data PWDT by setting a value of the second weight element WDTe2, which is determined to be smaller than the weight threshold value Wth, to the zero value, and may provide the pruned weight data PWDT to the host device 150. Herein, "L" is an" may denote any natural number.

In some embodiments, under control of the pruning manager 121, the weight comparator 123 may overwrite the pruned weight data PWDT on the weight data WDT of the memory cell array 110. For example, the storage space of the memory cell array 110 may be conserved by overwriting the pruned weight data PWDT on the weight data WDT, instead of maintaining the weight data WDT of the second memory region 112 of the memory cell array 110, after the pruning of the weight data WDT.

Figure 7:
FIG. 7 is a diagram describing pruning according to some embodiments.

FIG. 7 is a diagram describing pruning according to some embodiments of the present disclosure. Referring to FIGS. 5 and 7, the PIM 120 may perform the pruning of the activation data ADT and the pruning of the weight data WDT in the transfer-to-system mode. The PIM 120 may include the pruning manager 121, the activation comparator 122, and the weight comparator 123. The pruning manager 121 may manage the pruning of the activation data ADT and the pruning of the weight data WDT.

Under control of the pruning manager 121, the activation comparator 122 may generate an activation pruning flag APF indicating a pruning result of the activation data ADT. For example, under control of the pruning manager 121, the activation comparator 122 may determine whether each of the plurality of activation elements ADTe1 to ADTeM of the activation data ADT is smaller than the activation threshold value Ath, may generate the activation pruning flag APF indicating whether each of the plurality of activation elements ADTe1 to ADTeM of the activation data ADT is smaller than the activation threshold value Ath, may generate the pruned activation data PADT by merging the activation pruning flag APF and the activation data ADT, and may provide the pruned activation data PADT to the host device 150.

The activation pruning flag APF may include a series of single bit values corresponding to the pruning result of the plurality of activation elements ADTe1 to ADTeM. For example, a bit value that corresponds to the first activation element ADTe1 determined to be smaller than the activation threshold value Ath may be set to a first single bit value (e.g., "1"). For example, bit values, each of which corresponds to an activation element determined to be greater than or equal to the activation threshold value Ath, may be set to a second single bit value (e.g., "0").

In some embodiments, the pruning manager 121 may maintain the activation data ADT of the memory cell array 110 and may provide the pruned activation data PADT from the activation comparator 122 to the host device 150. For example, the activation data ADT of the memory cell array 110 may be maintained as original data. When a result of the neural network operation based on the pruned activation data PADT is inappropriate, the host device 150 may change a condition (e.g., the activation threshold value Ath) and may again perform the neural network operation on the activation data ADT.

In some embodiments, the size of the activation data ADT may be determined based on a read unit of the memory side. For example, the size of the activation data ADT may be determine depending on the size of a cache line of the host side or may be determined based on the size of a byte per address.

In some embodiments, the size of the activation pruning flag APF may be determined based on precision of the activation data ADT. For example, the size of the activation pruning flag APF may be determined based on the number of activation elements ADTe1 to ADTeM of the activation data ADT and the precision of the pruning operation. When the activation pruning flag APF only indicates whether the pruning is performed, the activation pruning flag APF may be implemented with a single bit; however, when the activation pruning flag APF further indicates the degree of closeness to the activation threshold value Ath, the activation pruning flag APF may be implemented with multiple bits. An example of the multi-bit activation pruning flag APF is described in detail with reference to FIG. 8.

Under control of the pruning manager 121, the weight comparator 123 may generate a weight pruning flag WPF indicating a pruning result of the weight data WDT. For example, under control of the pruning manager 121, the weight comparator 123 may determine whether each of the plurality of weight elements WDTe1 to WDTeL of the weight data WDT is smaller than the weight threshold value Wth, may generate the weight pruning flag WPF indicating whether each of the plurality of weight elements WDTe1 to WDTeL of the weight data WDT is smaller than the weight threshold value Wth, may generate the pruned weight data PWDT by merging the weight pruning flag WPF and the weight data WDT, and may provide the pruned weight data PWDT to the host device 150.

The weight pruning flag WPF may include a series of single bit values corresponding to the pruning result of the plurality of weight elements WDTe1 to WDTeL. For example, a bit value that corresponds to the second weight element WDTe2 determined to be smaller than the weight threshold value Wth may be set to the first single bit value. Bit values, each of which corresponds to a weight element determined to be greater than or equal to the weight threshold value Wth, may be set to the second single bit value.

In some embodiments, the pruning manager 121 may maintain the weight data WDT of the memory cell array 110 and may provide the pruned weight data PWDT from the weight comparator 123 to the host device 150. For example, the weight data WDT of the memory cell array 110 may be maintained as original data. When a result of the neural network operation based on the pruned weight data PWDT is inappropriate, the host device 150 may change a condition (e.g., the weight threshold value Wth) and may again perform the neural network operation on the weight data WDT.

In some embodiments, the size of the weight data WDT may be determined based on a read unit of the memory side.

For example, the size of the weight data WDT may be determined based on the size of a cache line of the host side or may be determined based on the size of a byte per address.

In some embodiments, the size of the weight pruning flag WPF may be determined based on precision of the weight data WDT. For example, the size of the weight pruning flag WPF may be determined based on the number of weight elements WDTe1 to WDTeL of the weight data WDT and the precision of the pruning operation. When the weight pruning flag WPF only indicates whether the pruning is performed, the weight pruning flag WPF may be implemented with a single bit; however, when the weight pruning flag WPF further indicates the degree of closeness to the weight threshold value Wth, the weight pruning flag WPF may be implemented with multiple bits. An example of the multi-bit weight pruning flag WPF is described in detail with reference to FIG. 8.

Figure 8:
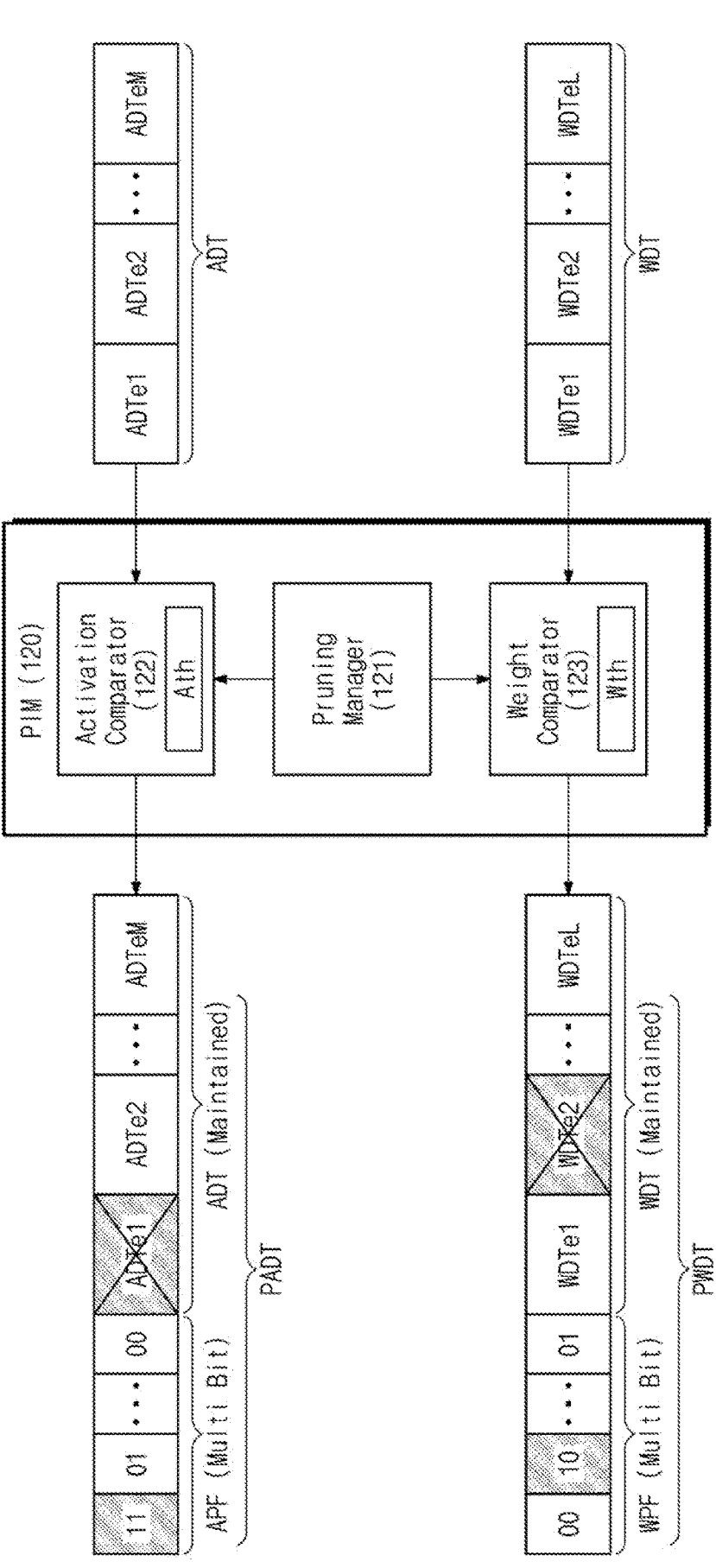
FIG. 8 is a diagram describing pruning according to some embodiments.

FIG. 8 is a diagram describing pruning according to some embodiments of the present disclosure. Referring to FIGS. 5 and 8, the PIM 120 may perform the pruning of the activation data ADT and the pruning of the weight data WDT in the transfer-to-system mode. The PIM 120 may include the pruning manager 121, the activation comparator 122, and the weight comparator 123. The pruning manager 121 may manage the pruning of the activation data ADT and the pruning of the weight data WDT.

Under control of the pruning manager 121, the activation comparator 122 may generate the activation pruning flag APF indicating a pruning result of the activation data ADT. The activation pruning flag APF may include a series of multi-bit values corresponding to the pruning result of the plurality of activation elements ADTe1 to ADTeM.

For example, a bit value that corresponds to an activation element, which is determined to be smaller than the activation threshold value Ath and to have a large difference with (or to be far from) the activation threshold value Ath, may be set to a first multi-bit value (e.g., "10").

For example, a bit value that corresponds to an activation element, which is determined to be smaller than the activation threshold value Ath and to have a small difference with (or to be near to) the activation threshold value Ath, may be set to a second multi-bit value (e.g., "11").

For example, a bit value that corresponds to an activation element, which is determined to be greater than or equal to the activation threshold value Ath and to have a small difference with the activation threshold value Ath, may be set to a third multi-bit value (e.g., "01").

For example, a bit value that corresponds to an activation element, which is determined to be greater than or equal to the activation threshold value Ath and to have a large difference with the activation threshold value Ath, from among the plurality of activation elements ADTe1 to ADTeM may be set to a fourth multi-bit value (e.g., "00").

Under control of the pruning manager 121, the weight comparator 123 may generate the weight pruning flag WPF indicating a pruning result of the weight data WDT. The weight pruning flag WPF may include a series of multi-bit values corresponding to the pruning result of the plurality of weight elements WDTe1 to WDTeL.

For example, a bit value that corresponds to a weight element, which is determined to be smaller than the weight threshold value Wth and to have a large difference with the weight threshold value Wth, may be set to a first multi-bit value (e.g., "10").

For example, a bit value that corresponds to a weight element, which is determined to be smaller than the weight threshold value Wth and to have a small difference with the weight threshold value Wth, may be set to a second multi-bit value (e.g., "11").

For example, a bit value that corresponds to a weight element, which is determined to be greater than or equal to the weight threshold value Wth and to have a small difference with the weight threshold value Wth, may be set to a third multi-bit value (e.g., "01").

For example, a bit value that corresponds to a weight element, which is determined to be greater than or equal to the weight threshold value Wth and to have a large difference with the weight threshold value Wth, may be set to a fourth multi-bit value (e.g., ("00").

In some embodiments, the host device 150 may change the condition of the following neural network operation based on the activation pruning flag APF and the weight pruning flag WPF that are implemented with a multi-bit value. For example, the multi-bit value may include a first bit and a second bit. The first bit may indicate whether a corresponding element is pruned. The second bit may indicate whether a value of the corresponding element is close to or distant from a threshold value (or has a small difference or a large difference with a threshold value). With reference to the second bit of the multi-bit value, the host device 150 may determine whether to adjust a threshold value in the following neural network operation or may determine a threshold value to be adjusted in the following neural network operation.

Figure 9:
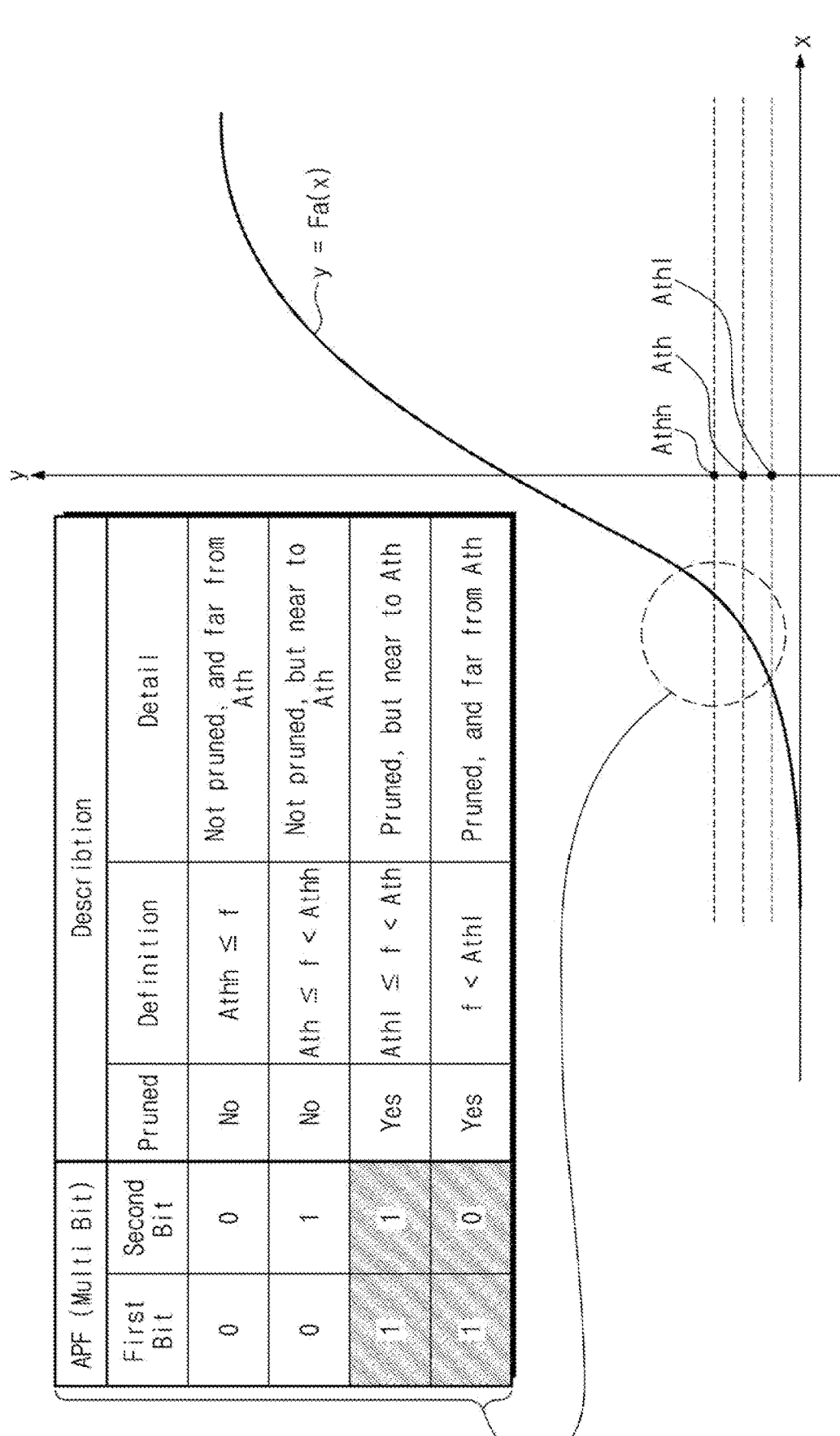
FIG. 9 is a diagram describing multi-bit values of FIG. 8, according to some embodiments.

FIG. 9 is a diagram describing multi-bit values of FIG. 8, according to some embodiments of the present disclosure. Referring to FIG. 9, a graph of the activation function Fa is illustrated. In FIG. 9, a horizontal axis represents an input value "x" of the activation function Fa, and a vertical axis represents an output value "y" of the activation function Fa.

The activation function Fa may be used to determine values of the plurality of activation elements ADTe1 to ADTeM of the activation data ADT of FIG. 8. For example, a summed value of multiplications of corresponding input elements and corresponding weight elements of a previous layer may be used as the input value "x" of the activation function Fa. The output value "y" may be obtained by applying the input value "x" to the activation function Fa. FIG. 9 illustrates an example in which the activation function Fa is a sigmoid function, but embodiments are not limited thereto.

The activation pruning flag APF may be implemented with multiple bits. The activation pruning flag APF may include a first bit and a second bit. The activation threshold value Ath may be used to determine whether to prune a corresponding activation element. A low activation threshold value Ath1 may be a value smaller than the activation threshold value Ath as much as a first reference magnitude. The low activation threshold value Ath1 may be used to determine whether a value of an activation element is near to the activation threshold value Ath. A high activation threshold value Athh may be a value greater than the activation threshold value Ath as much as a second reference magnitude. The high activation threshold value Athh may be used to determine whether a value of an activation element is near to the activation threshold value Ath.

When the first bit is "1" and the second bit is "0" (e.g., when the activation pruning flag APF has the first multi-bit value), a value of a corresponding activation element may be smaller than the low activation threshold value Ath1. In other words, the value of the corresponding activation element may be smaller than the activation threshold value Ath, and a difference with the activation threshold value Ath may be greater than the first reference magnitude. The corresponding activation element may be pruned and may be far from the activation threshold value Ath.

When the first bit is "1" and the second bit is "1" (e.g., when the activation pruning flag APF has the second multi-bit value), a value of a corresponding activation element may be greater than or equal to the low activation threshold value Ath1 and may be smaller than the activation threshold value Ath. In other words, the value of the corresponding activation element may be smaller than the activation threshold value Ath, and a difference with the activation threshold value Ath may not be greater than the first reference magnitude. The corresponding activation element may be pruned and may be near to the activation threshold value Ath.

When the first bit is "0" and the second bit is "1" (e.g., when the activation pruning flag APF has the third multi-bit value), a value of a corresponding activation element may be greater than or equal to the activation threshold value Ath and may be smaller than the high activation threshold value Athh. In other words, the value of the corresponding activation element may not be smaller than the activation threshold value Ath, and a difference with the activation threshold value Ath may be smaller than the second reference magnitude. The corresponding activation element may not be pruned and may be near to the activation threshold value Ath.

When the first bit is "0" and the second bit is "0" (e.g., when the activation pruning flag APF has the fourth multi-bit value), a value of a corresponding activation element may be greater than or equal than the high activation threshold value Athh. In other words, the value of the corresponding activation element may not be smaller than the activation threshold value Ath, and a difference with the activation threshold value Ath may not be smaller than the second reference magnitude. The corresponding activation element may not be pruned and may be far from the activation threshold value Ath.

Figure 10:
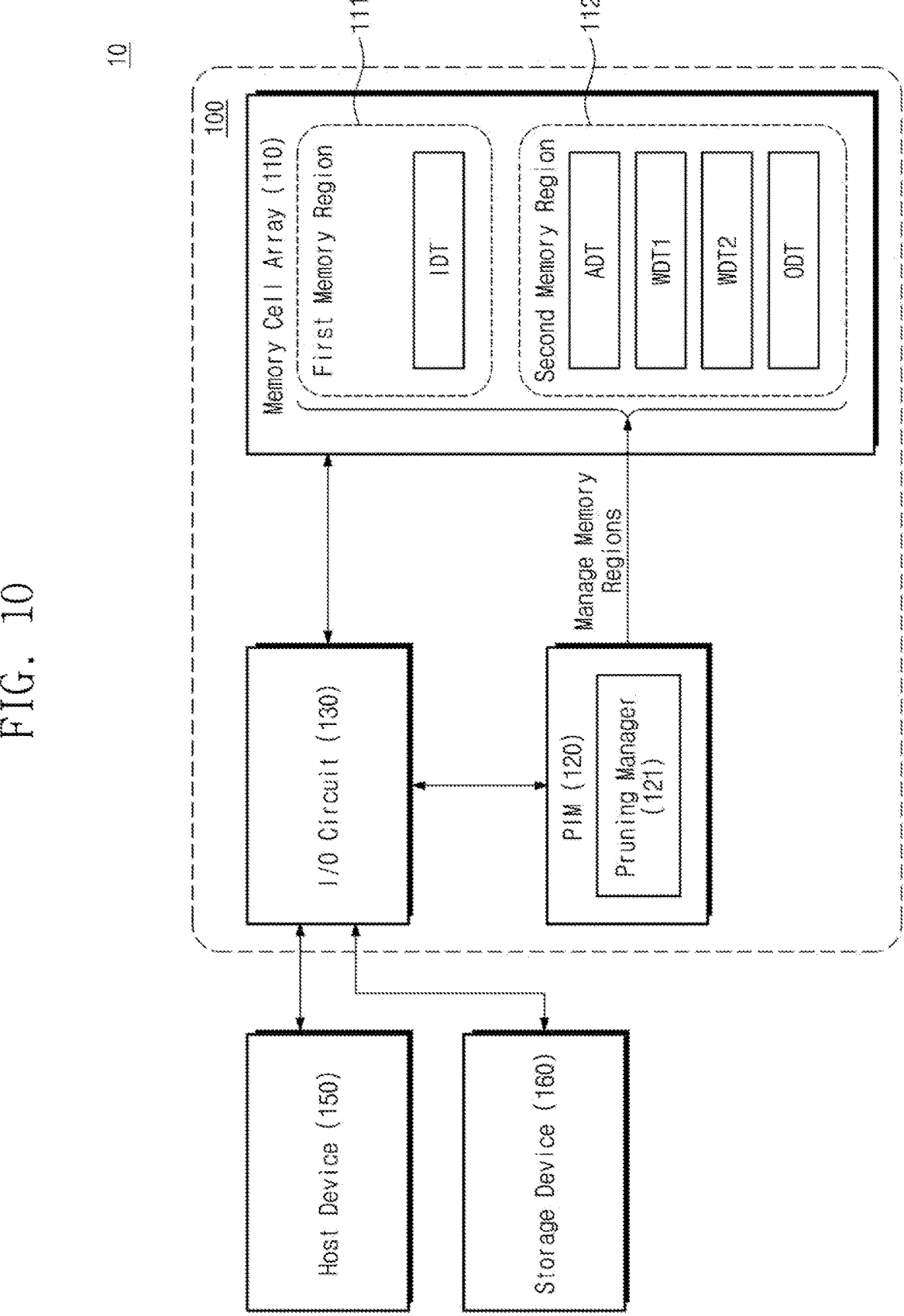
FIG. 10 is a diagram illustrating an electronic device managing memory regions, according to some embodiments.

FIG. 10 is a diagram illustrating an electronic device managing memory regions, according to some embodiments of the present disclosure. Referring to FIG. 10, the electronic device 10 may include the host device 150, a storage device 160, and the memory device 100. The memory device 100 may include the memory cell array 110, the PIM 120, and the I/O circuit 130.

The memory cell array 110 may include a first memory region 111 and a second memory region 112. The first memory region 111 may be allocated to store the input data IDT. The second memory region 112 may be allocated to store the activation data ADT, the first weight data WDT1, the second weight data WDT2, and the output data ODT. The PIM 120 may include the pruning manager 121.

The PIM 120 may manage memory regions of the memory cell array 110. For example, before the neural network operation is performed by the host device 150, the pruning manager 121 may allocate the first memory region 111 and the second memory region 112 in the memory cell array 110.

For example, based on the communication with the host device 150 and the storage device 160, the pruning manager 121 may predict or calculate sizes of the input data IDT, the activation data ADT, the first weight data WDT1, the second weight data WDT2, and the output data ODT, may allocate the first memory region 111 and the second memory region 112, and may adjust a ratio of the first and second memory regions 111 and 112 thus allocated. In embodiments, the pruning manager 121 may deallocate the first and second memory regions 111 and 112.

Figure 11:
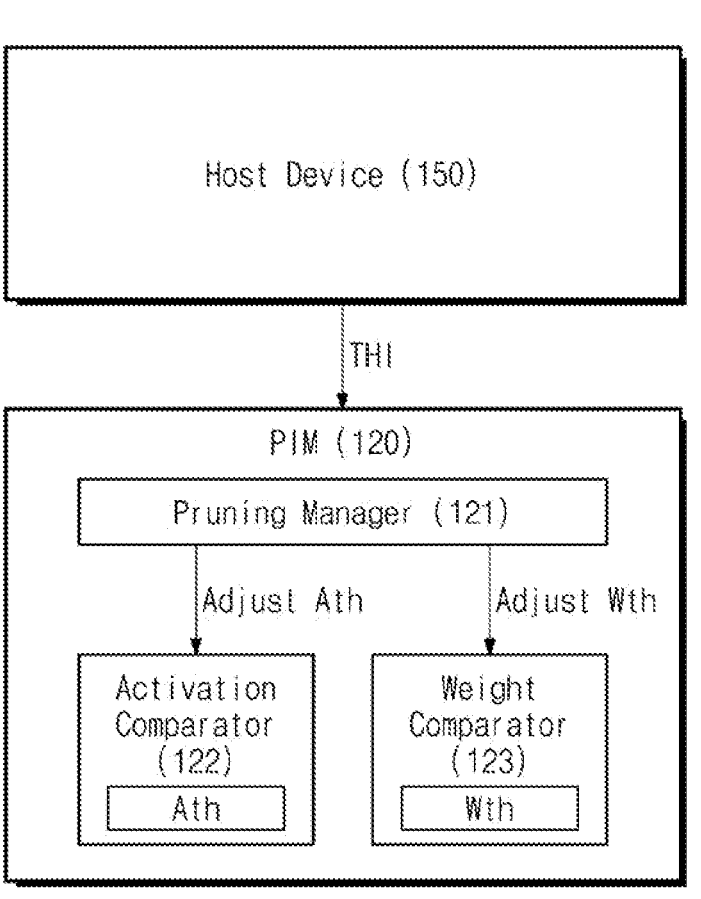
FIG. 11 is a diagram illustrating an electronic device adjusting threshold values, according to some embodiments.

FIG. 11 is a diagram illustrating an electronic device adjusting threshold values, according to some embodiments of the present disclosure. Referring to FIG. 11, the electronic device 10 may include the host device 150 and the PIM 120. The PIM 120 may include the pruning manager 121, the activation comparator 122, and the weight comparator 123.

The PIM 120 may adjust the activation threshold value Ath and the weight threshold value Wth. For example, before the neural network operation is performed by the host device 150, the pruning manager 121 may receive threshold value control information THI from the host device 150. The threshold value control information THI may be used to set or adjust the activation threshold value Ath and the weight threshold value Wth. Before the neural network operation is performed by the host device 150, the pruning manager 121 may set at least one of the activation threshold value Ath and the weight threshold value Wth based on the threshold value control information THI.

Figure 12:
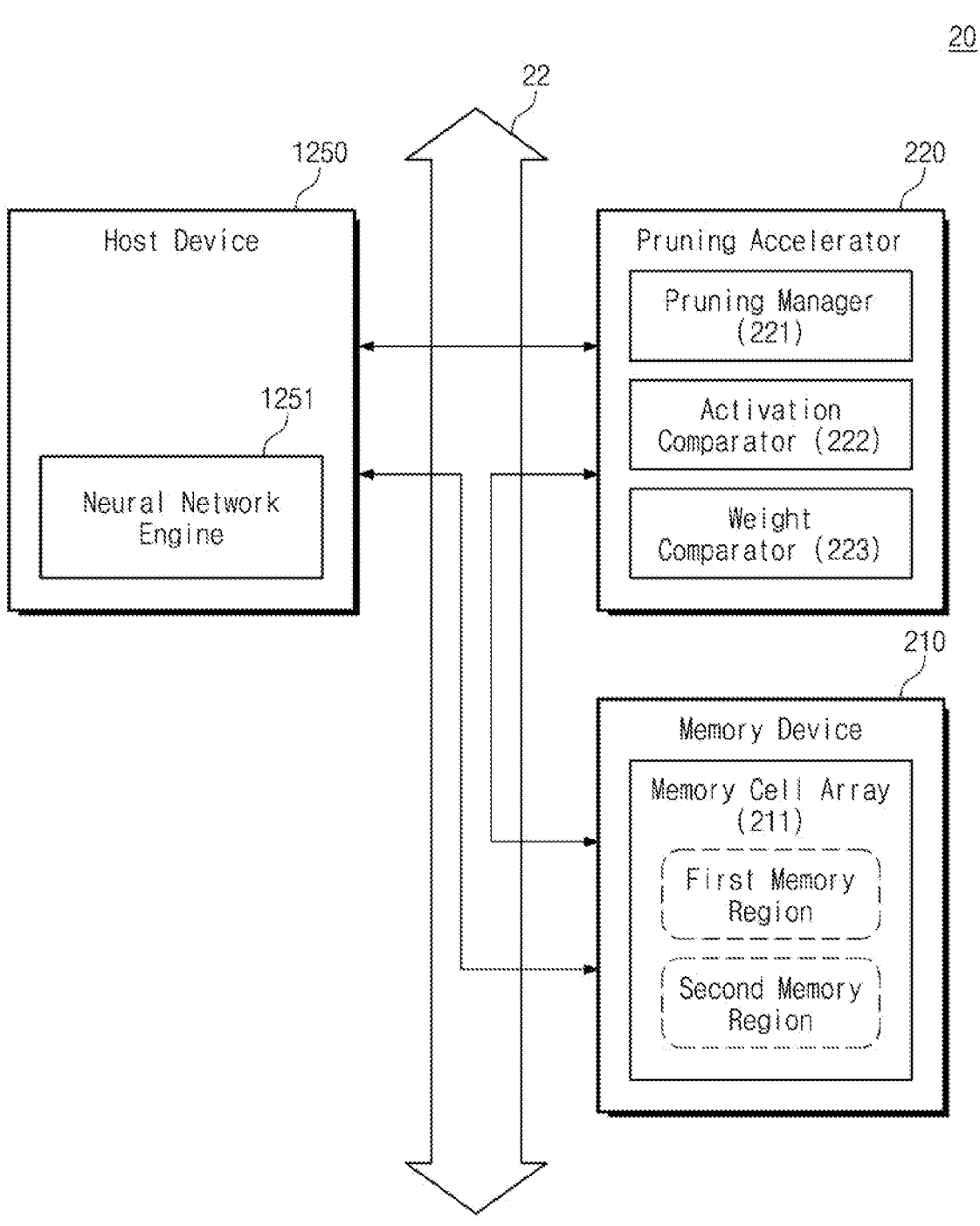
FIG. 12 is a block diagram describing an electronic device according to some embodiments.

FIG. 12 is a block diagram describing an electronic device according to some embodiments of the present disclosure. Referring to FIG. 12, an electronic device 20 may include a host device 1250, an interface circuit 22, a memory device 210, and a pruning accelerator 220. The interface circuit 22 may provide an interface between the host device 1250, the memory device 210, and the pruning accelerator 220. For example, the interface circuit 22 may be implemented with a peripheral component interconnect express (PCIe) interface circuit.

The host device 1250 may include a neural network engine 1251. The host device 1250 may correspond to the host device 150 of FIGS. 1, 4, 5, 10, and 11. The host device 1250 may receive pruned activation data and pruned weight data from the pruning accelerator 220. The host device 1250 may generate output data corresponding to the neural network operation performed based on the pruned activation data and the pruned weight data. The host device 1250 may provide the output data to the memory device 210.

The memory device 210 may include a memory cell array 211. The memory cell array 211 may include a first memory region 111 and a second memory region 112. The memory cell array 211 may correspond to the memory cell array 110 of FIGS. 1, 4, and 10.

The pruning accelerator 220 may prune the weight data and the activation data present in the second memory region 112 of the memory cell array 211 and may provide the pruned weight data and the pruned activation data to the host device 1250. The pruning accelerator 220 may include a pruning manager 221, an activation comparator 222, and a weight comparator 223. The pruning accelerator 220 may perform functions similar to those of the PIM 120 of FIGS. 1, 4, 5, 6, 7, 8, 10, and 11. In FIG. 1, the PIM 120 may be implemented in the memory device 100; in FIG. 12, the pruning accelerator 220 may be implemented with a separate hardware accelerator placed outside the memory device 210.

As described above, according to embodiments of the present disclosure, the electronic device 20 that includes pruning accelerator 220 for performing the pruning may be provided. Because the pruning is performed by the pruning accelerator 220, the computational load of the host device 1250 may decrease, and the efficiency and load-balancing of the entire system of the electronic device 20 may be improved.

Figure 13:
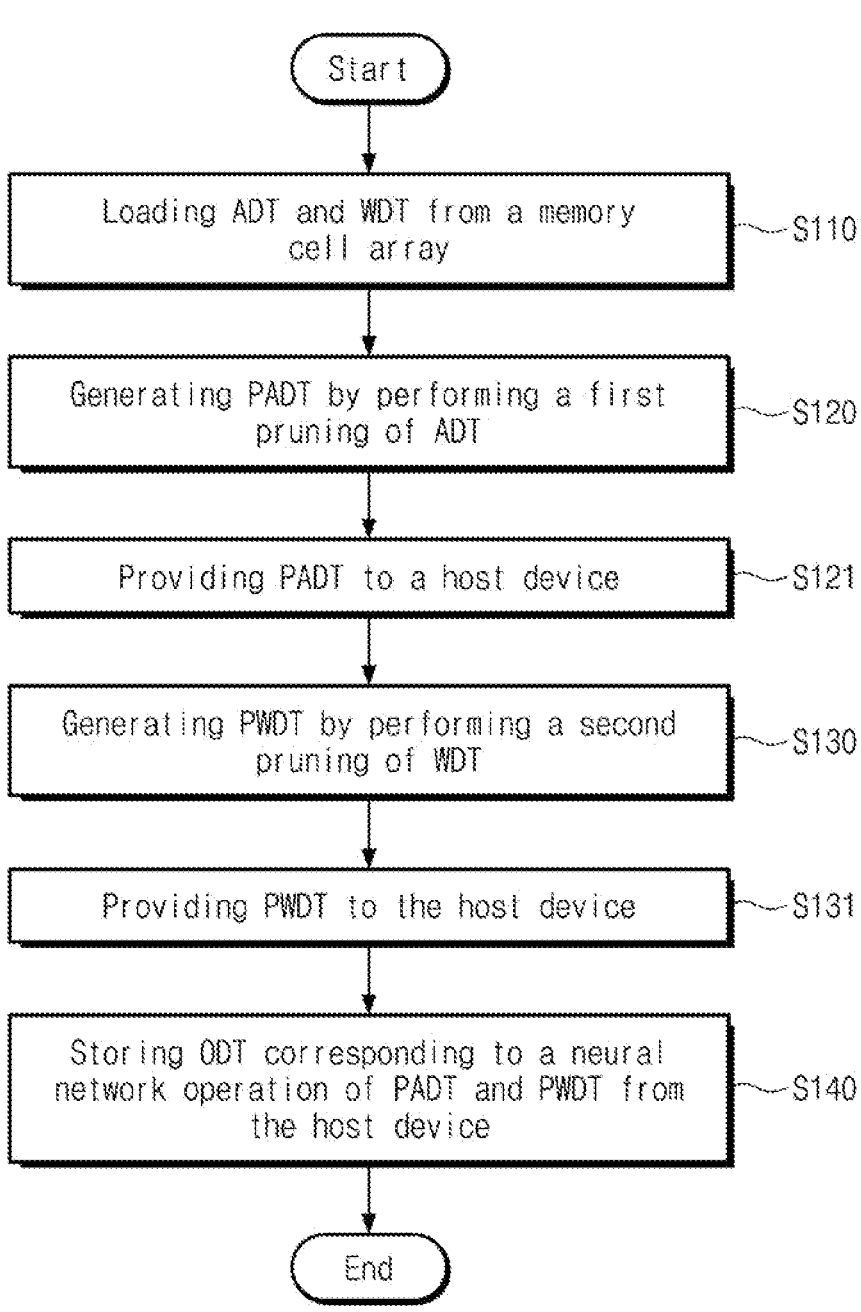
FIG. 13 is a flowchart describing a method of operating a memory device according to some embodiments.

FIG. 13 is a flowchart describing a method of operating a memory device according to some embodiments of the present disclosure. Referring to FIG. 13, the memory device may correspond to the memory device 100 of FIGS. 1, 4, and 10. The memory device may correspond to the memory side of FIG. 5. The memory device may communicate with a host device. The memory device may include a memory cell array and a PIM.

In operation S110, the PIM may load the activation data ADT and the weight data WDT from the memory cell array. The activation data ADT may be obtained by applying an activation function to a summed value of multiplications of input elements of input data and weight elements of corresponding weight data. The weight data WDT may be used in the convolution operation of the activation data ADT.

In operation S120, the PIM may generate the pruned activation data PADT by performing a first pruning of the activation data ADT. In embodiments, the first pruning may be referred to as a first pruning operation. For example, the PIM may perform the first pruning of the activation data ADT in the write-to-cell mode or the transfer-to-system mode.

In operation S121, the PIM may provide the pruned activation data PADT to the host device.

In operation S130, the PIM may generate the pruned weight data PWDT by performing a second pruning of the weight data WDT. In embodiments, the second pruning may be referred to as a second pruning operation. The PIM may perform the second pruning of the weight data WDT in the write-to-cell mode or the transfer-to-system mode.

In operation S131, the PIM may provide the pruned weight data PWDT to the host device.

In operation S140, the memory cell array may store the output data ODT corresponding to the neural network operation performed based on the pruned activation data PADT and the pruned weight data PWDT from the host device. For example, the host device may perform the neural network operation based on the pruned activation data PADT in operation S121 and the pruned weight data PWDT in operation S131, may generate the output data ODT, and may provide the output data ODT to the memory device.

Figure 14:
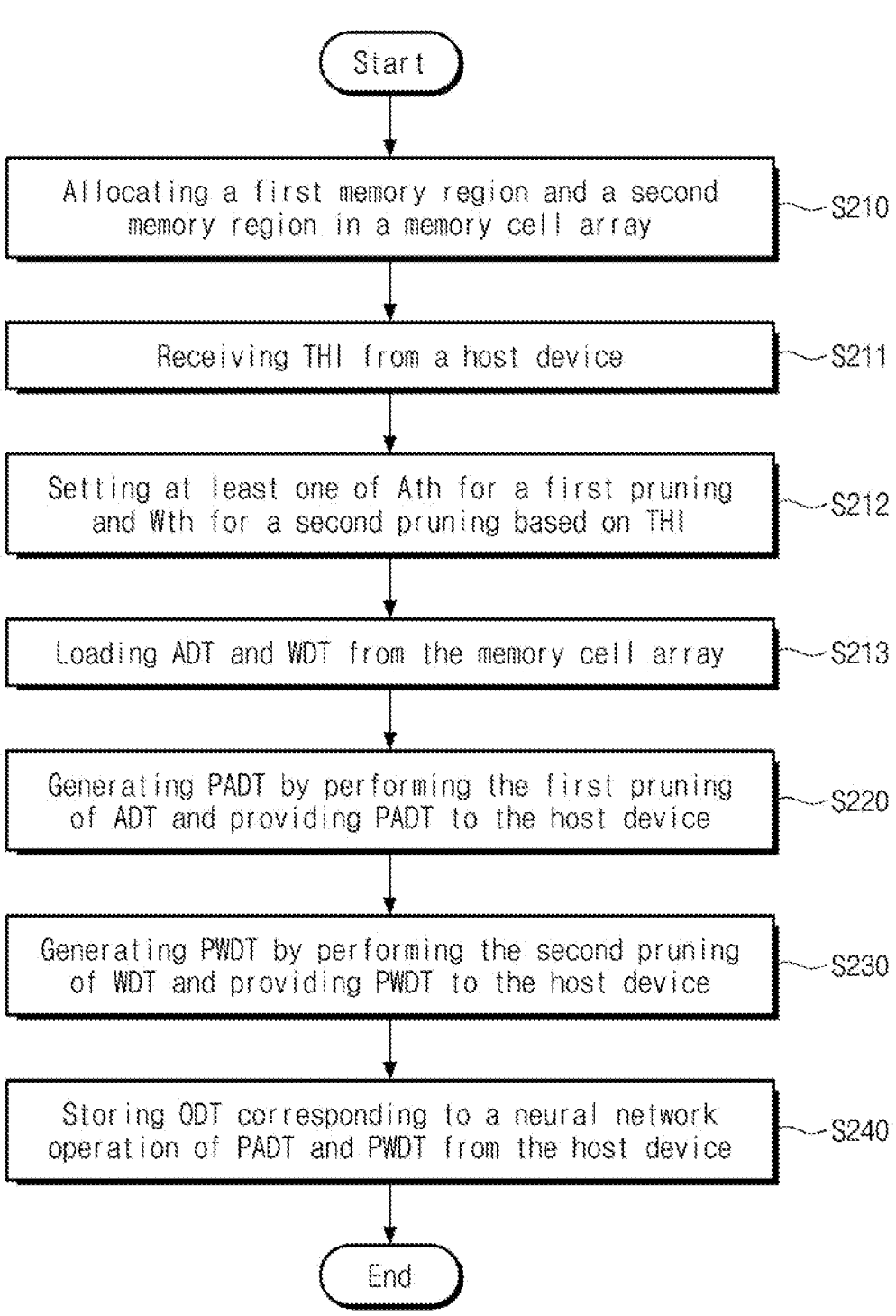
FIG. 14 is a flowchart describing a method of operating a memory device according to some embodiments.

FIG. 14 is a flowchart describing a method of operating a memory device according to some embodiments of the present disclosure. Referring to FIG. 14, a memory device may correspond to the memory device 100 of FIGS. 1, 4, and 10. The memory device may correspond to the memory side of FIG. 5. The memory device may communicate with a host device. The memory device may include a memory cell array and a PIM.

In operation S210, the PIM may allocate a first memory region 111 and a second memory region 112 in the memory cell array. The first memory region 111 may be allocated to store input data. The input data may be data of a previous layer used to generate the activation data ADT. The second memory region 112 may be allocated to store the activation data ADT, the weight data WDT, and the output data ODT.

In operation S211, the PIM may receive the threshold value control information THI from the host device.

In operation S212, the PIM may set at least one of the activation threshold value Ath for the first pruning and the weight threshold value Wth for the second pruning based on the threshold value control information THI.

In operation S213, the PIM may load the activation data ADT and the weight data WDT from the memory cell array.

In operation S220, the PIM may generate the pruned activation data PADT by performing the first pruning of the activation data ADT and may provide the pruned activation data PADT to the host device.

In operation S230, the PIM may generate the pruned weight data PWDT by performing the second pruning of the weight data WDT and may provide the pruned weight data PWDT to the host device.

In operation S240, the memory cell array may store the output data ODT corresponding to the neural network operation performed based on the pruned activation data PADT and the pruned weight data PWDT from the host device.

Figure 15:
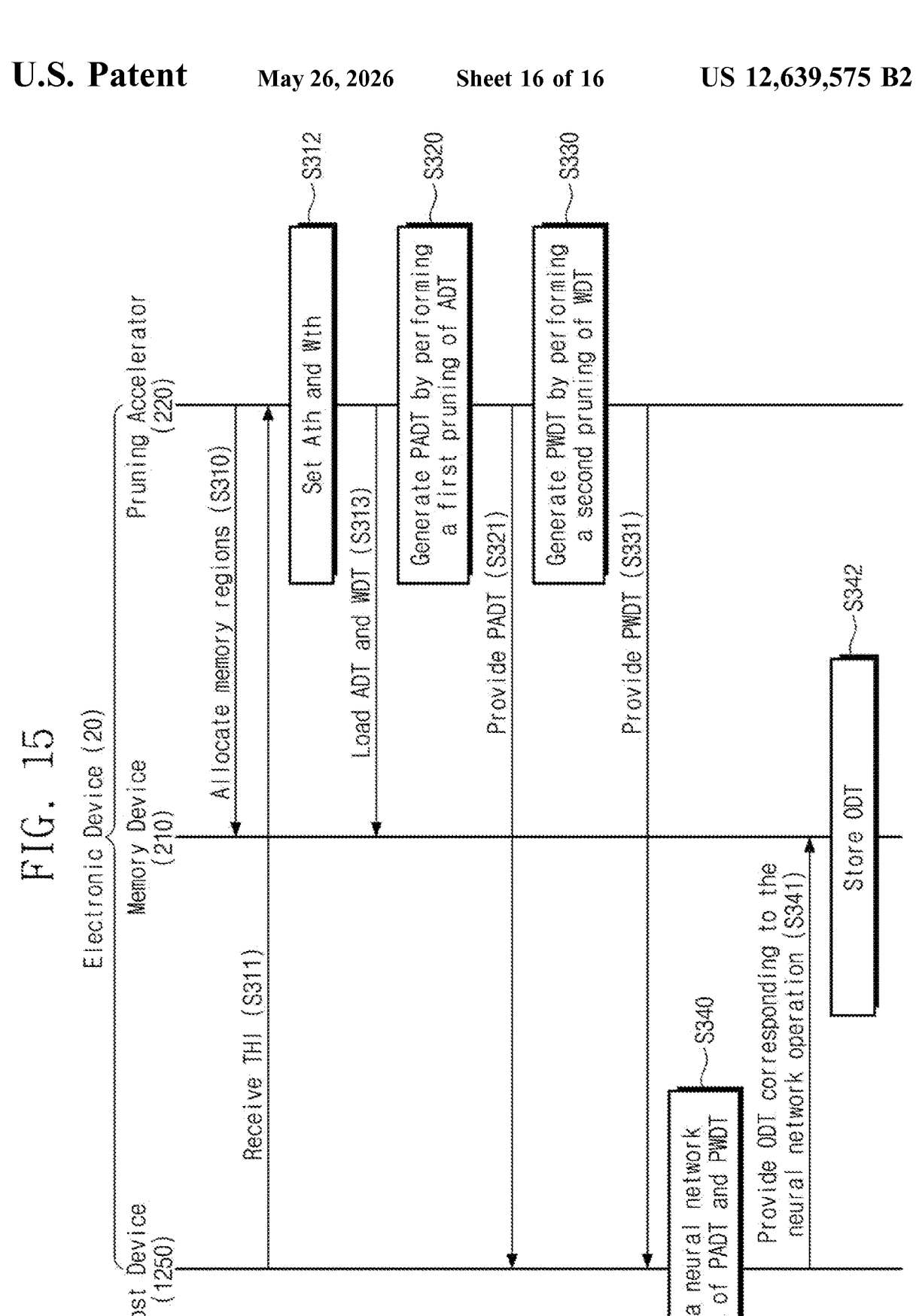
FIG. 15 is a flowchart describing a method of operating an electronic device according to some embodiments.

FIG. 15 is a flowchart describing a method of operating an electronic device according to some embodiments of the present disclosure. Referring to FIG. 15, the electronic device 20 may correspond to the electronic device 20 of FIG. 12. The electronic device 20 may include the host device 1250, the memory device 210, and the pruning accelerator 220.

In operation S310, the pruning accelerator 220 may allocate memory regions of the memory device 210. For example, the memory device 210 may include a memory cell array. The pruning accelerator 220 may allocate a first memory region 111 and a second memory region 112 in the memory cell array 110.

In operation S311, the pruning accelerator 220 may receive the threshold value control information THI from the host device.

In operation S312, the pruning accelerator 220 may set at least one of the activation threshold value Ath for the first pruning and the weight threshold value Wth for the second pruning based on the threshold value control information THI.

In operation S313, the pruning accelerator 220 may load the activation data ADT and the weight data WDT from the memory device 210.

In operation S320, the pruning accelerator 220 may generate the pruned activation data PADT by performing the first pruning of the activation data ADT. In some embodiments, the pruning accelerator 220 may perform the first pruning of the activation data ADT in the write-to-cell mode or the transfer-to-system mode.

In operation S321, the pruning accelerator 220 may provide the pruned activation data PADT to the host device 1250.

In operation S330, the pruning accelerator 220 may generate the pruned weight data PWDT by performing the second pruning of the weight data WDT. In some embodiments, the pruning accelerator 220 may perform the second pruning of the weight data WDT in the write-to-cell mode or the transfer-to-system mode.

In operation S331, the pruning accelerator 220 may provide the pruned weight data PWDT to the host device 1250.

In operation S340, the host device 1250 may perform the neural network operation based on the pruned activation data PADT and the pruned weight data PWDT. The host device 1250 may generate the output data ODT corresponding to the neural network operation.

In operation S341, the host device 1250 may provide the output data ODT corresponding to the neural network operation to the memory device 210.

In operation S342, the memory device 210 may store the output data ODT.

According to an embodiment of the present disclosure, a memory device configured to perform a pruning, a method of operating the same, and an electronic device configured to perform a pruning are provided.

Also, a memory device that reduces the computational load of a host device by performing pruning on both activation data and weight data and again performs the neural network operation under a changed condition by generating a pruning flag and maintaining original data, a method of operating the same, and an electronic device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a memory device which is configured to communicate with a host device, and which includes a memory cell array and a processing-in-memory (PIM) chip, the method comprising:
   loading activation data and weight data from the memory cell array, by the PIM chip;
   generating pruned activation data by performing a first pruning operation on the activation data, by the PIM chip;
   providing the pruned activation data to the host device, by the PIM chip;
   generating pruned weight data by performing a second pruning operation on the weight data, by the PIM chip;
   providing the pruned weight data to the host device, by the PIM chip; and
   storing output data corresponding to a neural network operation performed based on the pruned activation data and the pruned weight data, by the memory cell array.

2. The method of claim 1, wherein the activation data are obtained by applying an activation function to a summed value of multiplications of input elements corresponding to input data and weight elements corresponding to the weight data.

3. The method of claim 2, wherein the activation function comprises at least one of a sigmoid function, a hyperbolic tangent function, a softmax function, a rectified linear unit (ReLu) function, a leaky ReLu function, and an exponential linear unit function.

4. The method of claim 1, wherein the generating of the pruned activation data comprises:
   determining whether each activation element of a plurality of activation elements included in the activation data is smaller than an activation threshold value, by the PIM chip; and
   generating the pruned activation data by pruning at least one activation element determined to be smaller than the activation threshold value from among the plurality of activation elements, by the PIM chip.

5. The method of claim 4, wherein the pruning the at least one activation element comprises:
   generating the pruned activation data by setting the at least one activation element to a zero value, by the PIM chip; and
   overwriting the activation data stored in the memory cell array with the pruned activation data, by the PIM chip.

6. The method of claim 4, wherein the pruning the at least one activation element comprises:
   generating an activation pruning flag including a plurality of bits, wherein each bit of the plurality of bits indicates whether a corresponding activation element from among the plurality of activation elements is smaller than the activation threshold value, by the PIM chip; and
   generating the pruned activation data by merging the activation pruning flag and the activation data.

7. The method of claim 6, wherein the generating of the activation pruning flag comprises:

setting at least one bit corresponding to the at least one activation element from among the plurality of bits to a first single-bit value, by the PIM chip; and setting remaining bits corresponding to remaining activation elements determined to be greater than or equal to the activation threshold value from among the activation elements to a second single-bit value, by the PIM chip.

8. The method of claim 6, wherein the generating of the activation pruning flag comprises:

based on determining that a first activation element from among the plurality of activation elements is smaller than the activation threshold value, and that a difference between the first activation element and the activation threshold value is greater than a first reference magnitude, setting a bit value of a first bit which corresponds to the first activation element from among the plurality of bits to a first multi-bit value, by the PIM chip;

based on determining that a second activation element from among the plurality of activation elements is smaller than the activation threshold value, and that a difference between the second activation element and the activation threshold value is not greater than the first reference magnitude, setting a bit value of a second bit which corresponds to the second activation element from among the plurality of bits to a second multi-bit value, by the PIM chip;

based on determining that a third activation element from among the plurality of activation elements is greater than or equal to the activation threshold value, and that a difference between the third activation element and the activation threshold value is smaller than a second reference magnitude, setting a bit value of a third bit which corresponds to the third activation element from among the plurality of bits to a third multi-bit value, by the PIM chip; and based on determining that a fourth activation element from among the plurality of activation elements is greater than or equal to the activation threshold value, and that a difference between the fourth activation element and the activation threshold value is not smaller than the second reference magnitude, setting a bit value of a fourth bit which corresponds to the fourth activation element from among the plurality of bits to a fourth multi-bit value, by the PIM chip.

9. The method of claim 1, wherein the generating of the pruned weight data comprises:

determining whether each weight element of a plurality of weight elements included in the weight data is smaller than a weight threshold value, by the PIM chip; and generating the pruned weight data by pruning at least one weight element determined to be smaller than the weight threshold value from among the plurality of weight elements, by the PIM chip.

10. The method of claim 9, wherein the pruning the at least one weight element comprises:

generating the pruned weight data by setting the at least one weight element to a zero value, by the PIM chip; and overwriting the weight data stored in the memory cell array with the pruned weight data, by the PIM chip.

11. The method of claim 9, wherein the pruning the at least one weight element comprises:

generating a weight pruning flag including a plurality of bits, wherein each bit of the plurality of bits whether each a corresponding weight element from among the plurality of weight elements is smaller than the weight threshold value, by the PIM chip; and generating the pruned weight data by merging the weight pruning flag and the weight data.

12. The method of claim 11, wherein the generating of the weight pruning flag comprises:

setting at least one bit corresponding to the at least one weight element from among the plurality of bits to a first single-bit value, by the PIM chip; and setting remaining bits corresponding to remaining weight elements determined to be greater than or equal to the weight threshold value from among the weight elements to a second single-bit value, by the PIM chip.

13. The method of claim 11, wherein the generating of the weight pruning flag comprises:

based on determining that a first weight element from among the plurality of weight elements is smaller than the weight threshold value, and that a difference between the first weight element and the weight threshold value is greater than a first reference magnitude, setting a bit value of a first bit which corresponds to the first weight element from among the plurality of bits to a first multi-bit value, by the PIM chip;

based on determining that a second weight element from among the plurality of weight elements is smaller than the weight threshold value, and that a difference between the second weight element and the weight threshold value is not greater than the first reference magnitude, setting a bit value of a second bit which corresponds to the second weight element from among the plurality of bits to a second multi-bit value, by the PIM chip;

based on determining that a third weight element from among the plurality of weight elements is greater than or equal to the weight threshold value, and that a difference between the third weight element and the weight threshold value is smaller than a second reference magnitude, setting a bit value of a third bit which corresponds to the third weight element from among the plurality of bits to a third multi-bit value, by the PIM chip; and based on determining that a fourth weight element from among the plurality of weight elements is greater than or equal to the weight threshold value, and that a difference between the fourth weight element and the weight threshold value is not smaller than the second reference magnitude, setting a bit value of a fourth bit which corresponds to the fourth weight element from among the plurality of bits to a fourth multi-bit value, by the PIM chip.

14. The method of claim 1, further comprising:

allocating a first memory region and a second memory region in the memory cell array, by the PIM, before loading the activation data and the weight data, wherein the first memory region is allocated to store input data used to generate the activation data, and wherein the second memory region is allocated to store the activation data, the weight data, and the output data.

15. The method of claim 1, further comprising:

receiving threshold value control information from the host device, by the PIM, before performing the first pruning operation and the second pruning operation; and setting an activation threshold value for the first pruning operation and a weight threshold value for the second pruning operation based on the threshold value control information, by the PIM, before performing the first pruning operation and the second pruning operation.

16. A memory device comprising:
a memory cell array configured to store activation data and weight data; and
a processing-in-memory (PIM) chip configured to communicate with a host device and the memory cell array,
wherein the PIM is further configured to:
   load the activation data and the weight data from the memory cell array;
   generate pruned activation data by performing a first pruning operation on the activation data;
   provide the pruned activation data to the host device;
   generate pruned weight data by performing a second pruning operation on the weight data; and
   provide the pruned weight data to the host device, and
wherein the memory cell array is further configured to store output data corresponding to a neural network operation performed based on the pruned activation data and the pruned weight data.

17. The memory device of claim 16, wherein the PIM chip comprises:
a pruning manager configured to load the activation data and the weight data from the memory cell array;
an activation comparator configured to be controlled by the pruning manager to:
   determine whether each activation element of a plurality of activation elements included in the activation data is smaller than an activation threshold value,
   generate the pruned activation data by pruning at least one activation element determined to be smaller than the activation threshold value from among the plurality of activation elements, and
   provide the pruned activation data to the host device; and
a weight comparator configured to be controlled by the pruning manager to:
   determine whether each weight element of a plurality of weight elements included in the weight data is smaller than a weight threshold value,
   generate the pruned weight data by pruning at least one weight element determined to be smaller than the weight threshold value from among the plurality of weight elements, and
   provide the pruned weight data to the host device.

18. An electronic device comprising:
a host device;
a memory device configured to store activation data and weight data;
a pruning accelerator; and
an interface circuit configured to provide an interface between the host device, the memory device, and the pruning accelerator, wherein the pruning accelerator is configured to:
   load the activation data and the weight data from the memory device;
   generate pruned activation data by performing a first pruning operation on the activation data;
   provide the pruned activation data to the host device;
   generate pruned weight data by performing a second pruning operation on the weight data; and
   provide the pruned weight data to the host device.

19. The electronic device of claim 18, wherein the pruning accelerator comprises:
a pruning manager configured to load the activation data and the weight data from the memory device;
an activation comparator configured to be controlled by the pruning manager to:
   determine whether each activation element of a plurality of activation elements included in the activation data is smaller than an activation threshold value,
   generate the pruned activation data by pruning at least one activation element determined to be smaller than the activation threshold value from among the plurality of activation elements, and
   provide the pruned activation data to the host device; and
a weight comparator configured to be controlled by the pruning manager to:
   determine whether each weight element of a plurality of weight elements included in the weight data is smaller than a weight threshold value,
   generate the pruned weight data by pruning at least one weight element determined to be smaller than the weight threshold value from among the plurality of weight elements, and
   provide the pruned weight data to the host device.

20. The electronic device of claim 19, wherein the pruning manager is further configured to allocate a first memory region and a second memory region in a memory cell array of the memory device, before loading the activation data and the weight data,
wherein the first memory region is allocated to store input data used to generate the activation data,
wherein the second memory region is allocated to store the activation data and the weight data, and
wherein, before performing the first pruning operation and the second pruning operation, the pruning manager is further configured to:
   receive threshold value control information from the host device; and
   set at least one of the activation threshold value for the first pruning operation and the weight threshold value for the second pruning operation based on the threshold value control information.

* * * * *